US009475475B2

(12) United States Patent
Nakata et al.

(10) Patent No.: US 9,475,475 B2
(45) Date of Patent: Oct. 25, 2016

(54) HYDRAULIC BRAKE SYSTEM

(75) Inventors: Daisuke Nakata, Seto (JP); Takahiro Okano, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 35 days.

(21) Appl. No.: 14/008,501

(22) PCT Filed: Mar. 28, 2011

(86) PCT No.: PCT/JP2011/057596
§ 371 (c)(1),
(2), (4) Date: Sep. 27, 2013

(87) PCT Pub. No.: WO2012/131870
PCT Pub. Date: Oct. 4, 2012

(65) Prior Publication Data
US 2014/0014451 A1   Jan. 16, 2014

(51) Int. Cl.
| | |
|---|---|
| B60T 13/14 | (2006.01) |
| B60T 13/68 | (2006.01) |
| B60T 13/16 | (2006.01) |
| B60T 1/10 | (2006.01) |
| B60T 7/04 | (2006.01) |
| B60T 8/40 | (2006.01) |
| B60T 8/26 | (2006.01) |
| B60T 8/32 | (2006.01) |

(52) U.S. Cl.
CPC .............. *B60T 13/161* (2013.01); *B60T 1/10* (2013.01); *B60T 7/042* (2013.01); *B60T 8/267* (2013.01); *B60T 8/3275* (2013.01); *B60T 8/4072* (2013.01); *B60T 13/146* (2013.01); *B60T 13/166* (2013.01); *B60T 13/686* (2013.01); *B60T 2270/604* (2013.01)

(58) Field of Classification Search
CPC .............. B60T 13/143–13/146; B60T 13/148; B60T 13/162; B60T 13/165–13/166; B60T 13/168; B60T 13/585–13/586; B60T 13/686; B60T 13/745; B60T 1/10; B60T 8/267
See application file for complete search history.

(56) References Cited

U.S. PATENT DOCUMENTS

| | | | | |
|---|---|---|---|---|
| 3,907,375 A | * | 9/1975 | Lewis ..................... | B60T 8/328 188/345 |
| 5,568,962 A | * | 10/1996 | Enomoto et al. ................. | 303/3 |
| 5,769,509 A | | 6/1998 | Feigel et al. | |

(Continued)

FOREIGN PATENT DOCUMENTS

| | | |
|---|---|---|
| DE | 4443869 A1 * | 6/1996 |
| JP | 2001-294146 | 10/2001 |
| JP | 2005-28975 | 2/2005 |
| JP | 2006-123889 | 5/2006 |
| JP | 2007-203859 | 8/2007 |

(Continued)

*Primary Examiner* — Anna Momper
(74) *Attorney, Agent, or Firm* — Finnegan, Henderson, Farabow, Garrett & Dunner, LLP

(57) ABSTRACT

A hydraulic brake system includes: a plurality of hydraulic brakes; and a first hydraulic pressure generator including a first hydraulic pressure source and a first hydraulic pressure controlling portion that is configured to control an output hydraulic pressure of the first hydraulic pressure source to a target hydraulic pressure. The plurality of hydraulic brakes includes (a) at least one disk brake and (b) at least one drum brake. The first hydraulic pressure generator is in communication with a first brake cylinder that is the brake cylinder of each of the at least one disk brake, and is isolated from a second brake cylinder that is the brake cylinder of each of the at least one drum brake, in a case when a regenerative cooperative control is executed.

11 Claims, 22 Drawing Sheets

(56) References Cited

U.S. PATENT DOCUMENTS

2006/0066146 A1 3/2006 Otomo
2007/0176486 A1 8/2007 Nakamura
2011/0049973 A1 3/2011 Wuerth et al.

FOREIGN PATENT DOCUMENTS

| WO | WO 94/25322 | 11/1994 |
| WO | WO 95/05299 | 2/1995 |
| WO | WO 2009/150032 | 12/2009 |

* cited by examiner

|  | Mode A | Mode B | Mode C | Mode D | Mode E |
|---|---|---|---|---|---|
| MASTER CUTOFF VALVE (SMC) 138 | Open | Closed | Closed | Closed | Open |
| 1ST COMMON HYDRAULIC-PRESSURE CONTROL VALVE (SLA) 140 | Controlled | Controlled /Uncontrolled | Open | Closed | Open |
| ACCUMULATOR CUTOFF VALVE (SAcc) 136 | Closed | Open | Open | Open | Closed |
| SEPARATE VALVE (SCC) 134 | Closed | Open | Closed | Open | Closed |
| 2ND COMMON HYDRAULIC-PRESSURE CONTROL VALVE (SLR) 142 | Controlled | Uncontrolled /Controlled | Closed | Uncontrolled | Closed |
| PRESSURE HOLDING VALVES 130 PRESSURE REDUCING VALVES 131 | Uncontrolled | Uncontrolled | Controlled | Controlled | Uncontrolled |
| HYDRAULIC PRESSURE SUPPLY | F: Controlled pressure(Re) R: Master pressure | 4 wheels: Controlled pressure(Acc) | F: Regulator pressure R: Accumulator pressure | Controlled wheels: Accumulator pressure | F: Regulator pressure R: Master pressure |

Mode A: for Normal Braking [regenerative cooperative control (F wheels), communication with master cylinder (R wheels)]

Mode B: for Brake Assist Control [accumulator controlled pressure (4 wheels)]

Mode C: for ABS [control with use of regulator pressure (F wheels), control with use of accumulator pressure (R wheels)]

Mode D: for TRC, VSC [control with use of accumulator pressure (controlled wheels)]

Mode E: for System Failure [regulator pressure (F wheels), master pressure (R wheels)]

FIG.6

HYDRAULIC BRAKE SYSTEM

CROSS-REFERENCE TO RELATED APPLICATIONS

This application is a national phase application of International Application No. PCT/JP2011/057596, filed Mar. 28, 2011, the content of which is incorporated herein by reference.

TECHNICAL FIELD

The present invention relates to a hydraulic brake system including a hydraulic brake configured to restrain rotation of a wheel of a vehicle.

BACKGROUND ART

Patent Documents 1 and 2 disclose hydraulic brake systems in each of which a regenerative cooperative control is executed in a state when all of brake cylinders of hydraulic brakes respectively provided for a plurality of wheels of a vehicle are being isolated from a manual hydraulic pressure source.

In the hydraulic brake system disclosed in Patent Document 1, disk brakes are provided for front right and left wheels while drum brakes are provided for rear right and left wheels.

In the hydraulic brake system disclosed in Patent Document 2, a hydraulic pressure of a master cylinder is supplied to the brake cylinders belonging to one of two brake lines while a hydraulic pressure of a power hydraulic pressure source is controlled and then supplied to the brake cylinders belonging to the other of the two brake lines, in a case when a hydraulic pressure booster suffers from in a mechanical failure, or in a case when it is detected whether a fluid leakage is present or absent in a stop state of the vehicle. Further, in the hydraulic brake system disclosed in Patent Document 2, the hydraulic pressure of each of the brake cylinders provided for drive wheels of the vehicle is controlled by using the hydraulic pressure of the power hydraulic pressure source while the master cylinder is held in communication with the brake cylinders provided for non-drive wheels of the vehicle, in a case when a traction control is being executed.

In Patent Document 3, it is disclosed that, in execution of the regenerative cooperative control, the hydraulic pressure of the power hydraulic pressure source is controlled and then supplied to the brake cylinders provided for the drive wheels while a hydraulic pressure of a hydraulic pressure booster is supplied to the brake cylinders provided for the non-drive wheels.

PRIOR ART DOCUMENTS

Patent Documents

[Patent Document 1] JP-2005-28975A
[Patent Document 2] JP-2006-123889A
[Patent Document 3] JP-2007-203859A

DISCLOSURE OF THE INVENTION

Object to be Achieved by the Invention

An object of the present invention is to restrain a control hunting in a hydraulic brake system including a drum brake.

Measures for Achieving the Object and Effect

In a hydraulic brake system described in claim 1 of the present application, in a case when a regenerative cooperative control is executed, a controlled-hydraulic-pressure generator is in communication with a first brake cylinder that is a brake cylinder of a disk brake, and is isolated from a second brake cylinder that is a brake cylinder of a drum brake.

(i) A drum brake is more inexpensive than a disk brake. Therefore, as compared with a case where all of a plurality of hydraulic brakes are constituted by disk brakes, it is more possible to reduce a cost of the hydraulic brake system.

(ii) In a drum brake, upon brake release, a frictional engagement member is satisfactorily separable from a brake rotary body (i.e., drum), owing to a return spring. Therefore, a brake dragging is more unlikely to be caused as compared with a case of a disk brake, so that a fuel efficiency can be improved.

(iii) On the other hand, in a drum brake, a hydraulic pressure pulsation is easily caused whereby a control hunting is easily caused. However, in the present hydraulic brake system, the first hydraulic pressure generator is isolated from the brake cylinder of the drum brake, so that a first hydraulic pressure controlling portion is prevented from being affected by the pulsation caused in the drum brake and accordingly the control hunting due to the pulsation can be prevented.

Further, where the first hydraulic pressure controlling portion includes a first hydraulic pressure control valve, it is possible to reduce a number of switching operations of the first hydraulic pressure control valve and accordingly to increase the service life.

CLAIMABLE INVENTION

There will be described various modes of the invention (hereinafter referred to as "claimable invention") deemed to contain claimable features for which protection is sought.

(1) A hydraulic brake system comprising:
a plurality of hydraulic brakes provided for respective wheels of a vehicle, and configured to be activated by hydraulic pressures of respective brake cylinders thereof so as to restrain rotations of the respective wheels; and
a first hydraulic pressure generator including a first hydraulic pressure source and a first hydraulic pressure controlling portion that is configured to control an output hydraulic pressure of the first hydraulic pressure source to a target hydraulic pressure,
the hydraulic brake system being characterized in that:
the plurality of hydraulic brakes includes (a) at least one disk brake and (b) at least one drum brake;
the first hydraulic pressure generator is in communication with a first brake cylinder that is the brake cylinder of each of the at least one disk brake, and is isolated from a second brake cylinder that is the brake cylinder of each of the at least one drum brake, in a case when a regenerative cooperative control is executed.

The first hydraulic pressure source may be either (i) a power hydraulic pressure source configured to generate a hydraulic pressure by supply of an electric power thereto or (ii) a manual hydraulic pressure source configured to generate a hydraulic pressure as a result of operation of a brake operating member.

The first hydraulic pressure controlling portion may be either (i) a supplied electric power controlling portion configured to control the output hydraulic pressure to the target hydraulic pressure by controlling the electric power supplied to the power hydraulic pressure source or (ii) a portion including a first hydraulic pressure control valve disposed on an output side of the power hydraulic pressure source or the manual hydraulic pressure source and a first control valve controlling portion configured to cause the output hydraulic pressure to become close to the target hydraulic pressure by controlling the first hydraulic pressure control valve. It is noted that the target hydraulic pressure is determined in the regenerative cooperative control.

Further, in the case when the regenerative cooperative control is executed, a second hydraulic pressure generator including a second hydraulic pressure source is in communication with the second brake cylinder of each of the at least one drum brake. The second hydraulic pressure source may be either a manual hydraulic pressure source or a power hydraulic pressure source. However, it is desirable that the second hydraulic pressure source is capable of generating a hydraulic pressure independently of the first hydraulic pressure source. In the second hydraulic pressure generator, at least in the case when the regenerative cooperative control is executed, an output hydraulic pressure of the second hydraulic pressure source is not controlled based on a hydraulic pressure of the second brake cylinder.

Specifically described, the second hydraulic pressure generator may be (i) a hydraulic pressure generator which includes a second-brake-cylinder hydraulic pressure sensor configured to detect the hydraulic pressure of the second brake cylinder and which does not include a second hydraulic pressure controlling portion configured to control the output hydraulic pressure of the second hydraulic pressure source on the basis of the hydraulic pressure detected by the second-brake-cylinder hydraulic pressure sensor, or (ii) a hydraulic pressure generator which does not cause the second hydraulic pressure controlling portion to control the output hydraulic pressure of the second hydraulic pressure source at least in the case when the regenerative cooperative control is executed, even where the hydraulic pressure generator includes the second hydraulic pressure controlling portion. In the case when the regenerative cooperative control is executed, the hydraulic pressure of the second brake cylinder is likely to be equal to the output hydraulic pressure of the second hydraulic pressure source. (More precisely described, the hydraulic pressure of the second brake cylinder is likely to be lower than the output hydraulic pressure of the second hydraulic pressure source, by an amount corresponding to a pressure loss.)

(2) The hydraulic brake system according to mode (1), comprising:

a brake operating member operable by an operator of the vehicle; and a second hydraulic pressure source configured to generate a hydraulic pressure as a result of operation of the brake operating member, wherein the second hydraulic pressure source is in communication with the second brake cylinder in the case when the regenerative cooperative control is executed.

The second hydraulic pressure source, which is a manual hydraulic pressure source configured to generate the hydraulic pressure as a result of operation of the brake operating member, may be either a pressurizing chamber of a master cylinder or a booster chamber of a hydraulic pressure booster.

Further, where both of the first hydraulic pressure source and the second hydraulic pressure source are manual hydraulic pressure sources, it is possible to employ (i) an arrangement in which one of the hydraulic pressure sources is the pressurizing chamber of the master cylinder while the other of the hydraulic pressure sources is the booster chamber of the hydraulic pressure booster or (ii) an arrangement in which one of the hydraulic pressure sources is a pressurizing chamber of a tandem-type master cylinder while the other of the hydraulic pressure sources is another pressurizing chamber of the tandem-type master cylinder.

It is noted that, upon execution of the regenerative cooperative control, the second hydraulic pressure source is isolated from the first brake cylinder and is in communication with the second brake cylinder.

(3) The hydraulic brake system according to mode (2), wherein the second hydraulic pressure source is a pressurizing chamber of a master cylinder, and wherein the master cylinder includes a pressurizing piston that is linked to the brake operating member, and is configured to generate a hydraulic pressure in the pressurizing chamber that is located on a front side of the pressurizing piston such that the hydraulic pressure is generated based on an operating force applied to the brake operating member.

Upon execution of the regenerative cooperative control, the hydraulic pressure of the pressurizing chamber of the master cylinder is supplied to the second brake cylinder, so that it is possible to restrain reduction of a feeling given to the vehicle operator who operates the brake operating member, even without a stroke simulator. Consequently, the necessity of provision of the stroke simulator in the hydraulic brake system can be eliminated whereby the cost can be reduced.

Further, owing to the absence of the stroke simulator, the hydraulic brake system can be made compact in size and light in weight whereby the fuel efficiency can be improved.

As described above, in the present hydraulic brake system, it is possible to eliminate necessity of provision of the stroke simulator while maintaining a fundamental of the by-wire control which is "enabling the hydraulic pressure of the brake cylinder to be controlled to a magnitude different from that of the manual hydraulic pressure, while restraining reduction of a feeling given to the vehicle operator".

Further, since the master cylinder is in communication with the second brake cylinder of the drum brake, a pulsation caused in the second brake cylinder of the drum brake is caused to act on the brake operating member. In other words, the pulsation in the brake cylinder is absorbed by operation of the brake operating member by the vehicle operator, whereby promotion of vibration of the drum brake can be restrained.

(4) The hydraulic brake system according to mode (2) or (3), comprising:

(a) a common passage to which the at least one first brake cylinder, the at least one second brake cylinder, the first hydraulic pressure generator and the second hydraulic pressure source are connected; and (b) a separate valve disposed between a first passage portion and a second passage portion of the common passage, wherein the at least one first brake cylinder and the first hydraulic pressure generator are connected to the first passage portion while the at least one second brake cylinder and the second hydraulic pressure source are connected to the second passage portion.

When the first passage portion and the second passage portion are isolated from each other by the separate valve, the first brake cylinder and the second brake cylinder are isolated from each other, the first brake cylinder is isolated from the second hydraulic pressure source, and the second brake cylinder is isolated from the first hydraulic pressure generator. Consequently, a first brake line including the first hydraulic pressure generator and the first brake cylinder and a second brake line including the second hydraulic pressure source and the second brake cylinder become independent from each other, so that, even in the event of a fluid leakage or the like caused in either one of the first and second brake lines, the hydraulic pressure can be generated in the other of the first and second brake lines.

Further, where the separate valve is constituted by a normally-closed (NC) electromagnetic valve (hereinafter simply referred to as normally-closed electromagnetic valve) that is placed in its closed state when an electric current is not supplied to its solenoid, it is possible to cause the first and second brake lines to become independent from each other in the event of failure of an electric system or the like, thereby making it possible to increase a reliability of the hydraulic brake system.

(5) The hydraulic brake system according to mode (4), comprising:

(a) a power hydraulic pressure source which is connected to the second passage portion of the common passage and which serves as a third hydraulic pressure source configured to generate a hydraulic pressure by supply of an electric power thereto; and (b) a power-hydraulic-pressure-source cutoff valve disposed between the power hydraulic pressure source and the second passage portion of the common passage.

The power hydraulic pressure source is connected to the second passage portion to which the second brake cylinder and the second hydraulic pressure source are connected. Thus, the hydraulic pressure of the power hydraulic pressure source can be utilized when the hydraulic pressure of the second brake cylinder is required to be controlled to a magnitude that is deferent from a magnitude of the manual hydraulic pressure.

The power hydraulic pressure source may either include or not include an accumulator, which is configured to store a hydraulic fluid such that the stored hydraulic fluid is pressurized.

With the power hydraulic pressure source being connected to the common passage, (i) it is possible to supply the hydraulic pressure to the common passage even in a sate in which the brake operating member is not operated, and (ii) it is possible to cause the hydraulic pressure supplied to the common passage, to be higher than the hydraulic pressure of the second hydraulic pressure source.

It is preferable that the power-hydraulic-pressure-source cutoff valve is constituted by a normally-closed electromagnetic valve.

Further, the power-hydraulic-pressure-source cutoff valve may be constituted by either an electromagnetic valve (hereinafter referred to as an electromagnetic on-off valve) which is switchable between its open and closed states by selectively turning ON/OFF the supply of the electric current to the solenoid of the valve, or an electromagnetic valve (hereinafter referred to as an electromagnetic linear valve) that is capable of continuously controlling the magnitude of the hydraulic pressure of the common passage (i.e., a difference between the hydraulic pressure on one of opposite sides of the valve and the hydraulic pressure on the other of the opposite sides of the valve) by continuously controlling the electric current supplied to the solenoid of the valve.

Further, in the description of the present application, the term "electromagnetic valve" may be interpreted as either the electromagnetic on-off valve or the electromagnetic linear valve, unless particularly specified. Moreover, in the description of the present application, a valve which is a normally-open electromagnetic valve and which is an electromagnetic linear valve will be abbreviated to as "a normally-open electromagnetic linear valve", where appropriate. A valve which is a normally-closed electromagnetic valve and which is an electromagnetic linear valve will be abbreviated to as "a normally-closed electromagnetic linear valve", where appropriate. A valve which is a normally-open electromagnetic valve and which is an electromagnetic on-off valve will be abbreviated to as "a normally-open electromagnetic on-off valve", where appropriate. A valve which is a normally-closed electromagnetic valve and which is an electromagnetic on-off valve will be abbreviated to as "a normally-closed electromagnetic on-off valve", where appropriate.

(6) The hydraulic brake system according to any one of modes (1)-(5), wherein the first hydraulic pressure controlling portion includes a first hydraulic pressure control valve disposed between the first hydraulic pressure source and the common passage.

The first hydraulic pressure control valve is capable of controlling the hydraulic pressure of the first hydraulic pressure source and supplying the controlled hydraulic pressure to the common passage. With the first hydraulic pressure control valve being placed in its closed state, the first hydraulic pressure source is isolated from the common passage, namely, the first hydraulic pressure generator is substantially isolated from the common passage. In this sense, it can be considered that the first hydraulic pressure control valve has also a function serving as a first-hydraulic-pressure-generator cutoff valve.

It is noted that the first-hydraulic-pressure-generator cutoff valve, which is capable of isolating the first hydraulic pressure generator from the common passage, may be constituted by a valve that is other than the first hydraulic pressure control valve.

(7) The hydraulic brake system according to mode (6), comprising:

(a) a second-hydraulic-pressure-source cutoff valve disposed between the second hydraulic pressure source and the common passage; and (b) a hydraulic-pressure supply controller configured to control supply of a hydraulic pressure to the common passage from at least one of the power hydraulic pressure source, the second hydraulic pressure source and the first hydraulic pressure generator.

By controlling the power-hydraulic-pressure-source cutoff valve, the first-hydraulic-pressure-generator cutoff valve (or the first hydraulic pressure control valve) and the second-hydraulic-pressure-source cutoff valve, it is possible to supply the hydraulic pressure to the common passage from selected at least one of the power hydraulic pressure source, the first hydraulic pressure generator and the second hydraulic pressure source.

Further, the supply of the hydraulic pressure from the common passage to the first and second brake cylinders may be controlled by either the hydraulic-pressure supply controller or a brake-cylinder hydraulic-pressure controller that is other than the hydraulic-pressure supply controller. The supply of the hydraulic pressure from the common passage to the first and second brake cylinders may be controlled by, for example, a slip controller such as an anti-lock controller, a traction controller and a vehicle-stability controller.

It is preferable that either the first-hydraulic-pressure-generator cutoff valve and the second-hydraulic-pressure-source cutoff valve is constituted by a normally-open (NO) electromagnetic valve. Each of the first-hydraulic-pressure-generator cutoff valve and the second-hydraulic-pressure-source cutoff valve may be constituted by either an electromagnetic linear valve or an electromagnetic on-off valve. However, it is preferable that the first-hydraulic-pressure-generator cutoff valve is constituted by an electromagnetic linear valve where the first hydraulic pressure control valve serves as the first-hydraulic-pressure-generator cutoff valve.

(8) The hydraulic brake system according to mode (7), wherein the hydraulic-pressure supply controller includes a regenerative-cooperative-control-execution-time hydraulic-pressure supply controlling portion that is configured, in the case when the regenerative cooperative control is executed, to establish a state in which the first passage portion and the second passage portion of the common passage are isolated from each other while the hydraulic pressure is suppliable to the common passage from the first hydraulic pressure generator and the second hydraulic pressure source without supply of the hydraulic pressure to the common passage from the power hydraulic pressure source.

During execution of the regenerative cooperative control, it is common that the first-hydraulic-pressure-generator cutoff valve (e.g., the first hydraulic pressure control valve) is not always held in its closed state although there is a case when the first-hydraulic-pressure-generator cutoff valve is placed in its closed state. For example, when the required total braking force, which is required by the vehicle operator, is satisfied by cooperation of the regenerative braking force and the hydraulic braking force that is based on the hydraulic pressure of the second brake cylinder (which will be referred to as a second hydraulic braking force), the hydraulic pressure is not supplied to the first brake cylinder. On the other hand, when the required total braking force is not satisfied by cooperation of the regenerative braking force and the second hydraulic braking force, the hydraulic pressure is supplied to the first brake cylinder by placing the first hydraulic pressure control valve in its open state.

(9) The hydraulic brake system according to mode (7) or (8), wherein the hydraulic-pressure supply controller includes a brake-assist-control-execution-time hydraulic-pressure supply controlling portion that is configured, in a case when a brake assist control is executed, to establish a state in which the first passage portion and the second passage portion of the common passage are in communication with each other while the hydraulic pressure is suppliable to the common passage from the power hydraulic pressure source without supply of the hydraulic pressure to the common passage from the first hydraulic pressure generator and the second hydraulic pressure source.

By utilizing the hydraulic pressure of the power hydraulic pressure source, the hydraulic pressures of the first and second brake cylinders can be made higher than the manual hydraulic pressure.

Further, the regenerative cooperative control and the brake assist control may be executed either concurrently with each other or separately from each other.

(10) The hydraulic brake system according to any one of modes (1)-(9), comprising (a) a low pressure source and (b) a pressure-reducing electromagnetic control valve disposed between the low pressure source and the common passage.

The hydraulic pressure of the common passage can be satisfactorily controlled by the pressure-reducing electromagnetic control valve. The control of the hydraulic pressure of the common passage by the pressure-reducing electromagnetic control valve is effective particularly when the regenerative cooperative control and the brake assist control are executed.

From a point of view of a fail-safe or controllability, it is preferable that the pressure-reducing electromagnetic control valve is constituted by a normally-closed electromagnetic linear valve.

(11) The hydraulic brake system according to any one of modes (1)-(10), comprising (a) a low pressure source and (b) a slip-control valve device including a plurality of pressure-increasing individual control valves and a plurality of pressure-reducing individual control valves such that each of the pressure-increasing individual control valves is disposed between the common passage and a corresponding one of the brake cylinders and such that each of the pressure-reducing individual control valves is disposed between the low pressure source and a corresponding one of the brake cylinders.

(12) The hydraulic brake system according to mode (11), comprising a slip controlling portion that is configured to control the hydraulic pressure of at least one brake cylinder which is to be controlled and which is at least one of the at least one first brake cylinder and the at least one second brake cylinder that are connected to the common passage, by controlling the slip-control valve device, such that a slip ratio of the wheel for which the at least one brake cylinder to be controlled is provided is held within an appropriate range that is determined depending on a friction coefficient of a road surface.

Each of the pressure-increasing individual control valves and each of the pressure-reducing individual control valves are provided for a corresponding one of the brake cylinders, so that the hydraulic pressure of at least one brake cylinder, which is to be controlled and which is at least one of the brake cylinders, can be controlled individually, by individually controlling corresponding at least one of the pressure-increasing individual control valves and corresponding at least one of the pressure-reducing individual control valves.

As examples of a slip control, there are an antilock control (i.e., control of a brake slip), a traction control (i.e., control of a drive slip) and a vehicle stability control (i.e., control of a slide slip).

(13) The hydraulic brake system according to mode (11) or (12), wherein the hydraulic-pressure supply controller includes an antilock-control-execution-time hydraulic-pressure supply controlling portion that is configured, in a case when an antilock control is executed, to establish a state in which the first passage portion and the second passage portion of the common passage are isolated from each other while the hydraulic pressure is suppliable to the common passage from the first hydraulic pressure generator and the power hydraulic pressure source without supply of the hydraulic pressure to the common passage from the second hydraulic pressure source.

In the antilock control, the hydraulic pressure of the first brake cylinder is controlled by utilizing the hydraulic pressure of the first hydraulic pressure generator while the hydraulic pressure of the second brake cylinder is controlled by utilizing the hydraulic pressure of the power hydraulic pressure source.

For example, where a circulating-type anti-lock device is provided in the hydraulic brake system in which the antilock control is executed by utilizing the hydraulic pressure of the master cylinder, there is no case of shortage of the hydraulic pressure that is to be used for the antilock control. However, where there is provided an anti-lock device in which the working fluid flowing out from the brake cylinders is returned to a master reservoir, there is a risk of shortage of the working fluid, and the shortage of the working fluid would make it impossible to satisfactorily execute the antilock control (making it impossible to satisfactorily increase the hydraulic pressures of the brake cylinders) and cause an excessively deep introduction of the pressurizing piston into the master cylinder.

On the other hand, even where the working fluid flowing out from the brake cylinders is returned to the master reservoir in the hydraulic brake system, it is possible to restrain shortage of the working fluid, by executing the antilock control without utilizing the hydraulic pressure of the master cylinder. Thus, the shortage of the working fluid can be restrained whereby the antilock control can be satisfactorily executed and a brake stopping distance can be reduced. Further, the excessively deep introduction of the pressurizing piston into the master cylinder can be prevented.

(14) The hydraulic brake system according to mode (11) or (12), wherein the hydraulic-pressure supply controller includes an antilock-control-execution-time hydraulic-pressure supply controlling portion that is configured, in a case when an antilock control is executed, to establish a state in which the first passage portion and the second passage portion of the common passage are in communication with each other while the hydraulic pressure is suppliable to the common passage from the power hydraulic pressure source without supply of the hydraulic pressure to the common passage from the first hydraulic pressure generator and the second hydraulic pressure source.

In the hydraulic brake system described in this mode, the hydraulic pressures of the first and second brake cylinders are controlled by utilizing the hydraulic pressure of the power hydraulic pressure source.

Where the first hydraulic pressure source is constituted by the power hydraulic pressure source, it is also possible to utilize the hydraulic pressure of the first hydraulic pressure generator, for controlling the hydraulic pressures of the first and second brake cylinders.

(15) The hydraulic brake system according to any one of modes (11)-(14), wherein the hydraulic-pressure supply controller includes a no-braking-operation slip-control-execution-time hydraulic-pressure supply controlling portion that is configured, in a case when a slip control is executed without operation of the brake operating member, to establish a state in which the first passage portion and the second passage portion of the common passage are in communication with each other while the hydraulic pressure is suppliable to the common passage from the power hydraulic pressure source without supply of the hydraulic pressure to the common passage from the first hydraulic pressure generator and the second hydraulic pressure source.

When the slip control such as the traction control and the vehicle stability control is executed without operation of the brake operating member, it is appropriate that the hydraulic pressure of the power hydraulic pressure source is utilized.

The brake cylinder or cylinders provided for the wheel or wheels that are not subjected to the control, are isolated from the common passage.

(16) The hydraulic brake system according to any one of modes (11)-(15), comprising:

(a) a power hydraulic pressure source which is connected to the first passage portion of the common passage and which is configured to generate a hydraulic pressure by supply of an electric power thereto; and (b) a power-hydraulic-pressure-source cutoff valve disposed between the power hydraulic pressure source and the first passage portion of the common passage, wherein the hydraulic-pressure supply controller includes a traction-control-execution-time hydraulic-pressure supply controlling portion that is configured, in a case when a traction control is executed, to establish a state in which the first passage portion and the second passage portion of the common passage are isolated from each other while the hydraulic pressure is suppliable to the common passage from the power hydraulic pressure source without supply of the hydraulic pressure to the common passage from the first hydraulic pressure generator and the second hydraulic pressure source.

The first brake cylinder, for which the regenerative cooperative control is to be executed, is provided for the drive wheel. Therefore, the hydraulic pressure of the first brake cylinder is subjected to the traction control.

By supplying the hydraulic pressure of the power hydraulic pressure source to the first passage portion of the common passage in a state in which the first and second passage portions of the common passage are isolated from each other, the hydraulic pressure of the first brake cylinder can be controlled by utilizing the hydraulic pressure of the first brake cylinder.

The control of the slip-control valve device is not essential, and the hydraulic pressure of the first brake cylinder can be controlled by controlling the hydraulic pressure of the first passage portion of the common passage.

(17) The hydraulic brake system according to any one of modes (1)-(16), comprising:

a manual hydraulic pressure generator including: (i) a master cylinder which includes a pressurizing piston that is linked to the brake operating member, and which is configured to generate a hydraulic pressure in a pressurizing chamber that is located on a front side of the pressurizing piston such that the hydraulic pressure is generated based on an operating force applied to the brake operating member; and (ii) a hydraulic pressure booster which includes a power piston that is linked to the brake operating member and the pressurizing piston, the hydraulic pressure booster being configured to cause a hydraulic pressure in a regulator chamber to be adjusted to a magnitude corresponding to the operating force applied to the brake operating member by operation of the brake operating member, and to supply the adjusted hydraulic pressure to a booster chamber that is located on a rear side of the power piston, so as to boost the operating force applied to the brake operating member and output the boosted operating force to the pressurizing piston, wherein the first hydraulic pressure source is the hydraulic pressure booster, and wherein the first hydraulic pressure controlling portion includes (c) a first hydraulic pressure control valve configured to control the output hydraulic pressure of the hydraulic pressure booster and (d) a first control valve controlling portion configured to control the first hydraulic pressure control valve such that the output hydraulic pressure of the hydraulic pressure booster becomes close to a target hydraulic pressure.

The first hydraulic pressure source is constituted by the hydraulic pressure booster. Precisely described, the first hydraulic pressure source is constructed to include at least one of the regulator chamber and the booster chamber. In the regenerative cooperative control, the target hydraulic pressure is never determined to a value higher than the manual hydraulic pressure. Therefore, it is appropriate to utilize the hydraulic pressure of the hydraulic pressure booster.

The power hydraulic pressure source and the low pressure source are connected to the regulator chamber. The power hydraulic pressure source and the low pressure source are selectively brought into communication with the regulator chamber, depending on movement of a movable member caused by movement of the brake operating member, whereby the hydraulic pressure of the regulator chamber is adjusted to a magnitude corresponding to the operating force applied to the brake operating member. In view of this, it is considered that the hydraulic pressure booster has a function serving as a controller that is configured to control the output hydraulic pressure of the power hydraulic pressure source.

However, the hydraulic pressure is never generated in the regulator chamber in a state in which the brake operating member is not operated. The hydraulic pressure is generated in the regulator chamber, as a result of operation of the brake operating member. In view of this, it is appropriate to consider that the hydraulic pressure booster is a form of the manual hydraulic pressure source.

(18) The hydraulic brake system according to any one of modes (1)-(16), wherein the first hydraulic pressure source is a power hydraulic pressure source that is configured to generate the hydraulic pressure by supply of an electric power thereto, and wherein the first hydraulic pressure controlling portion includes a power hydraulic pressure controlling portion that is configured to control the output hydraulic pressure of the power hydraulic pressure source to a target hydraulic pressure.

In the first hydraulic pressure generator, the hydraulic pressure of the power hydraulic pressure source is controlled, and the controlled hydraulic pressure is outputted. In this case, the target hydraulic pressure can be set to also a value that is higher than the manual hydraulic pressure.

(19) The hydraulic brake system according to any one of modes (1)-(18), wherein the vehicle includes at least one drive wheel and at least one non-drive wheel, and wherein the first brake cylinder is provided for each of the at least one drive wheel, while the second brake cylinder is provided for each of the at least one non-drive wheel.

The vehicle may be either a front-wheel drive vehicle or a rear-wheel drive vehicle.

To the drive wheel, a drive device of the vehicle is connected. The drive device may either include or not include a driving electric motor. Further, the driving electric motor may be either provided commonly for the at least one drive wheel, or provided individually for each one of the at least one drive wheel, like a wheel-in motor.

(20) The hydraulic brake system according to any one of modes (1)-(19), wherein the first brake cylinder is provided for each of front right and left wheels of the vehicle, while the second brake cylinder is provided for each of rear right and left wheels of the vehicle.

(21) The hydraulic brake system according to any one of modes (1)-(20), wherein the vehicle includes a drive device having a driving electric motor, the hydraulic brake system comprising a regenerative cooperative controller that is configured to control the hydraulic pressure of the first brake cylinder such that a total braking force becomes close to a required total braking force that provides a deceleration of the vehicle required by an operator of the vehicle, the total braking force including at least one of a regenerative braking force applied by control of the driving electric motor and a hydraulic braking force generated by the plurality of hydraulic brakes provided in the vehicle.

(22) The hydraulic brake system according to any one of modes (1)-(21), wherein the first hydraulic pressure controlling portion is a regenerative-cooperative controlling portion including a regenerative-cooperative-control-execution-time target hydraulic pressure determining portion that is configured to determine the target hydraulic pressure such that an actual total braking force becomes close to a required total braking force that is determined based on an operational state of the brake operating member, the actual total braking force including at least one of (i) a regenerative braking force applied to the at least one drive wheel, (ii) a hydraulic braking force applied, by the hydraulic pressure of the first brake cylinder, to the at least one drive wheel and (iii) a hydraulic braking force applied, by the hydraulic pressure of the second brake cylinder, to the at least one non-drive wheel, and wherein the regenerative-cooperative controlling portion is configured to control the output hydraulic pressure of the first hydraulic pressure source such that the output hydraulic pressure becomes close to the target hydraulic pressure determined by the regenerative-cooperative-control-execution-time target hydraulic pressure determining portion.

The regenerative braking force is applied to the drive wheel, while the hydraulic braking force is applied to the non-drive wheel as well as to the drive wheel. The actual total braking force includes at least one of an actual regenerative braking force $Fm$, a first hydraulic braking force $Fp1$ (corresponding to the hydraulic pressure of the first brake cylinder) and a second hydraulic braking force $Fp2$ (corresponding to the hydraulic pressure of the second brake cylinder). Where the second hydraulic braking force $Fp2$ is not electrically controllable, the first hydraulic braking force $Fp1$ is controlled. There is a case when a target value of the first hydraulic braking force $Fp1$ is zero.

In the regenerative cooperative control, it is considered that there is a certain relationship between the hydraulic braking force and the hydraulic pressure of the brake cylinder. Described precisely, the hydraulic braking force is determined depending on, for example, the hydraulic pressure of the brake cylinder, a friction coefficient between a frictional engagement member and a brake rotary body, and a friction coefficient between a tire and a road surface, so that the braking force is not necessarily increased as the brake cylinder hydraulic pressure (i.e., pressing force) is increased. However, within a range in which the hydraulic pressure of the brake cylinder is not excessively large in relation with the friction coefficient of the road surface, it can be considered that there is a certain relationship between the braking force and the brake cylinder hydraulic pressure (i.e., frictional member pressing force). Therefore, in the regenerative cooperative control, the brake cylinder hydraulic pressure is controlled by regarding that there is a certain relationship between the braking force and the brake cylinder hydraulic pressure.

(23) The hydraulic brake system according to any one of modes (1)-(22), wherein the first hydraulic pressure controlling portion includes an electromagnetic linear valve configured to control a magnitude of the output hydraulic pressure of the first hydraulic pressure source, by continuous control of an electric current supplied to a solenoid thereof.

(24) The hydraulic brake system according to any one of modes (1)-(23), wherein the first hydraulic pressure controlling portion includes a required-deceleration-dependent target hydraulic pressure determining portion configured to determine the target hydraulic pressure whose magnitude provides a deceleration of the vehicle that is determined based on an operational state of the brake operating member.

In the first hydraulic pressure generator, it is also possible to control the output hydraulic pressure of the first hydraulic pressure source to such a magnitude that can establish a required deceleration required by the vehicle operator.

(25) A hydraulic brake system with two brake lines, which is to be provided in a vehicle, the hydraulic brake system being characterized by comprising:

a first hydraulic pressure generator including a first hydraulic pressure source and a first hydraulic pressure controlling portion that is configured to control a hydraulic pressure of the first hydraulic pressure source to a target hydraulic pressure;

a brake operating member operable by an operator of the vehicle; and a mater cylinder configured to generate a hydraulic pressure as a result of operation of the brake operating member such that the generated hydraulic pressure is dependent on an operational state of the brake operating member, wherein an output hydraulic pressure of the first hydraulic pressure generator is supplied to at least one first brake cylinder that belongs to one of the two brake lines without supply of the output hydraulic pressure of the first hydraulic pressure generator to at least one second brake cylinder that belongs to the other of the two brake lines, in a case when a regenerative cooperative control is executed, and wherein an output hydraulic pressure of the master cylinder is supplied to the at least one second brake cylinder without supply of the output hydraulic pressure of the master cylinder to the at least one first brake cylinder, in the case when the regenerative cooperative control is executed.

In the hydraulic brake system described in this mode, the stroke simulator is not required.

Further, each of the first and second brake cylinders may be either a brake cylinder of a disk brake or a brake cylinder of a drum brake.

It is noted that the technical features described in any one of the above modes (1)-(24) can be employed in the hydraulic brake system described in this mode.

(26) A hydraulic brake system with two brake lines, which is to be provided in a vehicle, the hydraulic brake system being characterized by comprising:

a brake operating member operable by an operator of the vehicle;

first and second manual hydraulic pressure sources each of which is configured to generate a hydraulic pressure as a result of operation of the brake operating member; and a first hydraulic pressure controlling portion that is configured to control an output hydraulic pressure of the first manual hydraulic pressure source, wherein the output hydraulic pressure controlled by the first hydraulic pressure controlling portion is supplied to at least one first brake cylinder that belongs to one of the two brake lines without supply of the output hydraulic pressure controlled by the first hydraulic pressure controlling portion to at least one second brake cylinder that belongs to the other of the two brake lines, in a case when a regenerative cooperative control is executed, and wherein a hydraulic pressure of the second manual hydraulic pressure source is supplied to the at least one second brake cylinder without supply of the hydraulic pressure of the second manual hydraulic pressure source to the at least one first brake cylinder, in the case when the regenerative cooperative control is executed.

In a case when it is not required that a hydraulic pressure higher than the hydraulic pressure of the manual hydraulic pressure source is supplied to the first brake cylinder, it is possible to supply the hydraulic pressure of the manual hydraulic pressure source to the first brake cylinder by controlling the hydraulic pressure of the manual hydraulic pressure source.

The technical features described in any one of the above modes (1)-(25) can be employed in the hydraulic brake system described in this mode.

(27) A hydraulic brake system comprising:

a plurality of hydraulic brakes provided for respective wheels of a vehicle, and configured to be activated by hydraulic pressures of respective brake cylinders thereof so as to restrain rotations of the respective wheels; and a first hydraulic pressure generator including a first hydraulic pressure source and a first hydraulic pressure controlling portion that is configured to control an output hydraulic pressure of the first hydraulic pressure source to a target hydraulic pressure, a brake operating member operable by an operator of the vehicle; and a second hydraulic pressure source configured to generate a hydraulic pressure as a result of operation of the brake operating member such that the generated hydraulic pressure is dependent on an operational state of the brake operating member, the hydraulic brake system being characterized in that:

the plurality of hydraulic brakes includes (a) at least one disk brake and (b) at least one drum brake;

an output hydraulic pressure of the second hydraulic pressure source is supplied to a second brake cylinder that is the brake cylinder of each of the at least one drum brake without supply of the output hydraulic pressure of the second hydraulic pressure source to a first brake cylinder that is the brake cylinder of each of the at least one disk brake, in a case when the brake operating member is operated during running of the vehicle; and an output hydraulic pressure of the first hydraulic pressure generator is supplied to the first brake cylinder without supply of the output hydraulic pressure of the first hydraulic pressure generator to the second brake cylinder, in the case when the brake operating member is operated during running of the vehicle.

BRIEF DESCRIPTION OF DRAWINGS

FIG. 6 is a view summarizing contents of operation of the above-described hydraulic brake system.

MODES FOR CARRYING OUT THE INVENTION

Hereinafter, a hydraulic brake system as an embodiment of the present invention will be described with reference to drawings.

Embodiment 1

<Vehicle>

There will be first described a vehicle on which a hydraulic brake system according to the present embodiment is installed.

Figure 1:
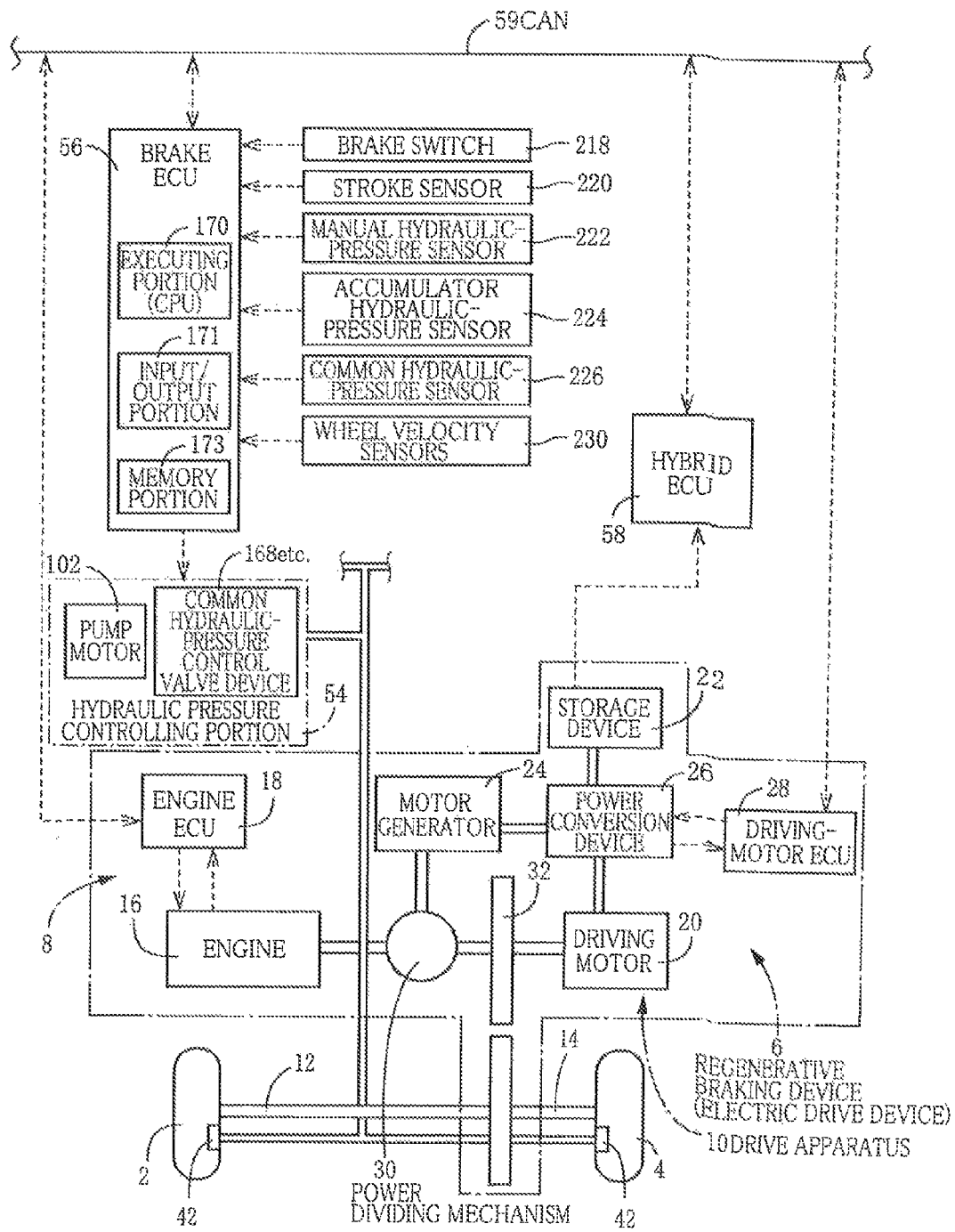
FIG. 1 is a view schematically showing an entirety of a vehicle in which a hydraulic brake system according to an embodiment of the present invention is installed.

As shown in FIG. 1, this vehicle is a hybrid vehicle having a drive device that includes an electric motor and an engine, so that front left and right wheels 2, 4 as drive wheels are to be driven by a drive apparatus 10 including an electric drive device 6 and an internal-combustion drive device 8. A drive power of the drive apparatus 10 is transmitted to the front left and right wheels 2, 4 via drive shafts 12, 14. The internal-combustion drive device 8 includes an engine 16 and an engine ECU 18 that is configured to control activation of the engine 16. The electric drive device 6 includes an electrically driving motor (hereinafter abbreviated to as an electric motor where appropriate) 20, a storage device 22, a motor generator 24, a power conversion device 26 and a driving-motor ECU (hereinafter abbreviated to as a motor ECU where appropriate) 28.

The electric motor 20, motor generator 24 and engine 16 are connected to one another via a power dividing mechanism 30. The electric motor 20, motor generator 24, engine 16 and power dividing mechanism 30 are controlled so as to selectively establish a state in which only a driving torque of the electric motor 20 is transmitted to an output member 32, a state in which a driving torque of the engine 16 and the driving torque of the electric motor 20 are both transmitted to the output member 32, and a state in which an output of the engine 16 is outputted to the motor generator 24 and the output member 32. The driving force transmitted to the output member 32 is transmitted to the drive shafts 12, 14 via a speed reducer and differential gears.

The power conversion device 26 includes an inverter, and is controlled by the motor ECU 28. With an electric current control performed for the inverter, the power conversion device 26 selectively establishes at least a rotary driving state in which the electric motor 20 is rotated by an electric energy supplied from the storage device 22 to the driving motor 20 and a charging state in which the power conversion device 26 serves as a generator upon regenerative braking so as to charge the storage device 22 with an electric energy. During the charging state, a regenerative braking torque is applied to each of the front left and right wheels 4, 2. In this sense, the electric drive device 6 can be considered as a regenerative braking device.

The storage device 22 may be constituted by, for example, a device including a nickel hydride battery or a device including a lithium ion battery.

The hydraulic brake system includes: brake cylinders 42 of respective hydraulic brakes 40 provided for the respective front left and right wheels 2, 4; brake cylinders 52 of respective hydraulic brakes 50 provided for the respective rear left and right wheels 46, 48 (see FIG. 2); and a hydraulic-pressure controlling portion 54 configured to control hydraulic pressures of the respective brake cylinders 42, 52. The hydraulic-pressure controlling portion 54 is controlled by a brake ECU 56 that is constituted principally by a computer.

Further, the vehicle is provided with a hybrid ECU 58. The hybrid ECU 58, brake ECU 56, engine ECU 18 and motor ECU 28 are connected to one another via a CAN (car area network) 59, so that these ECUs 58, 56, 18, 28 are communicable to one another, and required information are transmitted among the ECUs 58, 56, 18, 28 as needed.

It is noted that constructions of the drive apparatus and drive transmission apparatus of the vehicle, on which the present hydraulic brake system is to be installed, are not limited to those illustrated in FIG. 1. The present hydraulic brake system is applicable also to a vehicle equipped with a drive apparatus and a drive transmission apparatus having constructions that are different from the illustrated constructions.

Further, the present hydraulic brake system is installable also on an ordinary hybrid vehicle (i.e., hybrid vehicle other than a plug-in hybrid vehicle), a plug-in hybrid vehicle, an electric vehicle, a fuel battery vehicle and the like. In an electric vehicle, the internal-combustion drive device 8 is not required. In a fuel battery vehicle, the driving motor is driven by, for example, a fuel battery stack or the like.

Further, the present hydraulic brake system is installable also on an internal-combustion drive vehicle. In such a vehicle not equipped with the electric drive device 6, a regenerative braking torque is not applied to the driving wheels 2, 4 so that a regenerative cooperative control is not executed. For example, the hydraulic pressure of each of the brake cylinders 42 provided for the drive wheels 2, 4 can be controlled to a magnitude that can establish a vehicle running deceleration required by a vehicle operator.

<Brake Circuit>

Figure 2A:
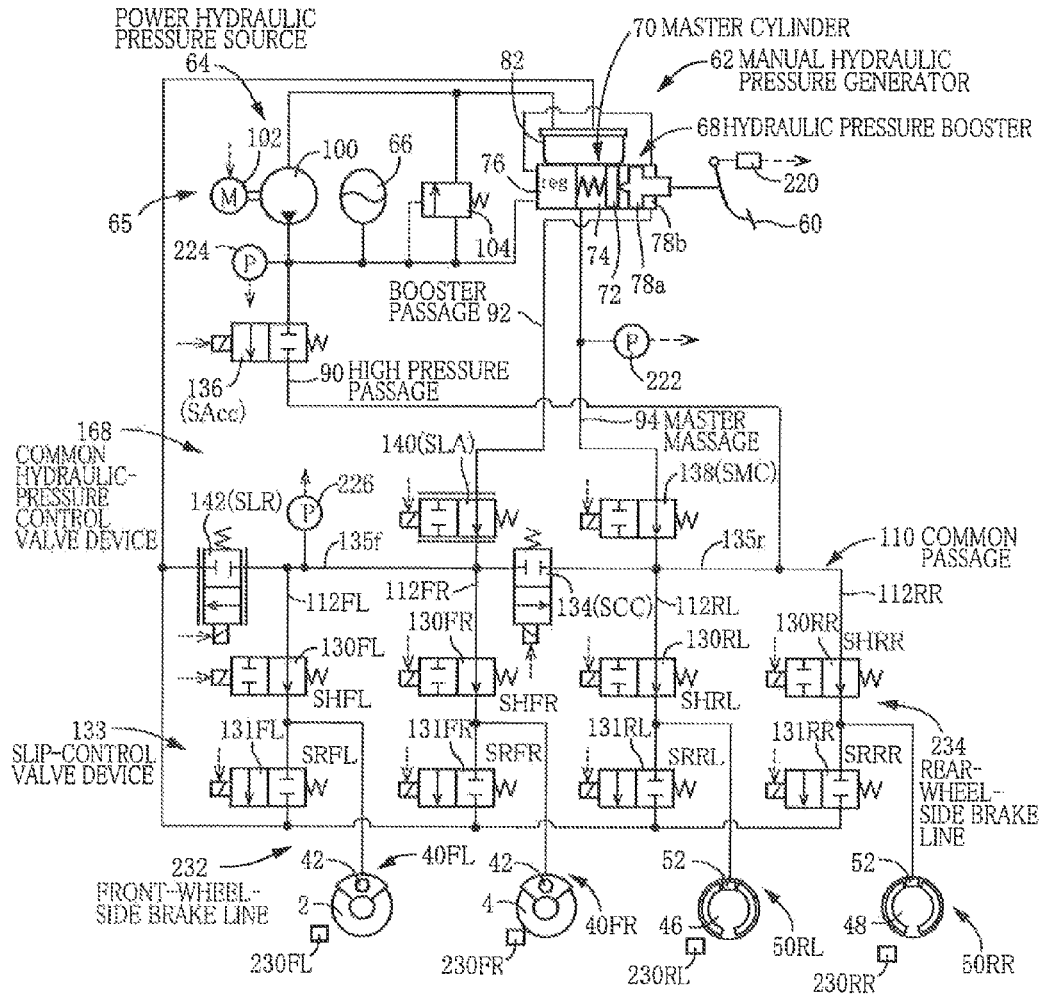
FIG. 2A is a circuit diagram showing a brake hydraulic pressure circuit of the above-described hydraulic brake system.

The hydraulic brake system includes a brake circuit as shown in FIG. 2A.

In the following description of the brake circuit, each of the brake cylinders, hydraulic brakes and below-described various electromagnetic valves will be referred together with, as a suffix, one of reference signs (FR, FL, RR, RL) indicative of the respective front right, front left, rear right and rear left wheels, where it should be clarified which one of the four wheels the referred brake cylinder, hydraulic brake or electromagnetic valve corresponds to. However, each of the brake cylinders, hydraulic brakes and electromagnetic valves will be referred without such reference signs, where it is referred to as a representative of those provided for the four wheels, or where the above-described clarification is not required.

Reference sign "60" denotes a brake pedal as a brake operating member, reference sign "62" denotes a manual hydraulic pressure source which is configured to generate a hydraulic pressure by operation of the brake pedal 60, and reference sign "64" denotes a power hydraulic pressure source including a pump device 65 and an accumulator 66.

a) Hydraulic Pressure Source

Figure 2B:
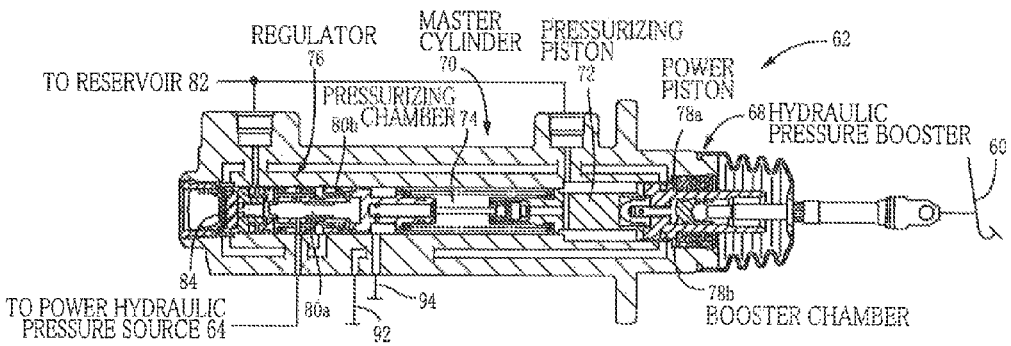
FIG. 2B is a cross sectional view of a hydraulic pressure booster included in the above-described brake hydraulic pressure circuit.

As shown in FIG. 2B, the manual hydraulic pressure generator 62 is a hydrobooster-equipped master cylinder including a hydraulic pressure booster 68 and a master cylinder 70.

The master cylinder 70 includes a pressurizing piston 72 that is linked to the brake pedal 60, and is configured to generate a hydraulic pressure in a pressurizing chamber 74 located on a front side of the pressurizing piston 72, owing to an operation of the brake pedal 60.

The hydraulic pressure booster 68 includes (a) a regulator 76 (reg), (b) a power piston 78a which is linked to the brake pedal 60 and the pressurizing piston 72 and (c) a booster chamber 78b disposed on a rear side of the power piston 78a.

The regulator 76 includes a spool (i.e., movable member) 80a and a regulator chamber 80b. By movement of the spool 80a that is caused by movement of the pressurizing piston 72, the power hydraulic pressure source 64 and a reservoir (i.e., master reservoir) 82 are selectively brought into communication with the regulator chamber 80b, such that the hydraulic pressure of the regulator chamber 80b is adjusted to a magnitude which is determined depending on the brake operating force (and which is higher than a magnitude corresponding to the brake operating force). The hydraulic pressure of the regulator chamber 80b is supplied to the booster chamber 78b whereby a force is applied to the power piston 78a so as to force the power piston 78 in a forward direction so that the brake operating force is assisted. It is noted that reference sign "84" denotes a reaction disk.

When the brake pedal 60 is depressed, the power piston 78a is moved forwardly whereby the pressurizing piston 72 is moved forwardly. The forward movement of the pressurizing piston 72 causes the spool 80a to be moved forwardly, whereby the hydraulic pressure of the regulator chamber 80b is adjusted to a magnitude that is determined depending on the brake operating force. The adjusted hydraulic pressure of the regulator chamber 80b is supplied to the booster chamber 78b, so as to be applied to the power piston 78a.

Thus, the brake operating force and the assisting force (i.e., force corresponding to the hydraulic pressure of the booster chamber 78b) are caused to act on the pressurizing piston 72, whereby a hydraulic pressure based on the boosted brake operating force is generated in the pressurizing chamber 74.

In the present embodiment, the hydraulic pressure of the regulator chamber 80b and the hydraulic pressure of the pressurizing chamber 74 are made substantially equal to each other in magnitude.

In the power hydraulic pressure source 64, the pump device 65 includes a pump 100 and a pump motor 102, so that a working fluid is pumped from the reservoir 82 by activation of the pump 100, and the pumped working fluid is accumulated in the accumulator 66. The pump motor 102 is controlled such that the pressure of the working fluid accumulated in the accumulator 66 is held within a predetermined range. Further, owing to a relief valve 104, a discharge pressure of the pump 100 is prevented from being excessively increased.

A high pressure passage 90, a booster passage 92 and a master passage 94 are connected to the power hydraulic pressure source 64, the booster chamber 78b of the hydraulic pressure booster 68 and the pressurizing chamber 74 of the master cylinder 70, respectively, whereby the power hydraulic pressure source 64, the booster chamber 78b and the pressurizing chamber 74 are connected to the common passage 110. Further, the brake cylinders 42FL, 42FR provided for the respective front left and right wheels 2, 4 and the brake cylinders 52RL, 52RR provided for the respective rear left and right wheels 46,48 are connected to the common passage 110 via respective individual passages 112FL, 112FR, 112RL, 112RR.

b) Hydraulic Brakes

Figure 3:
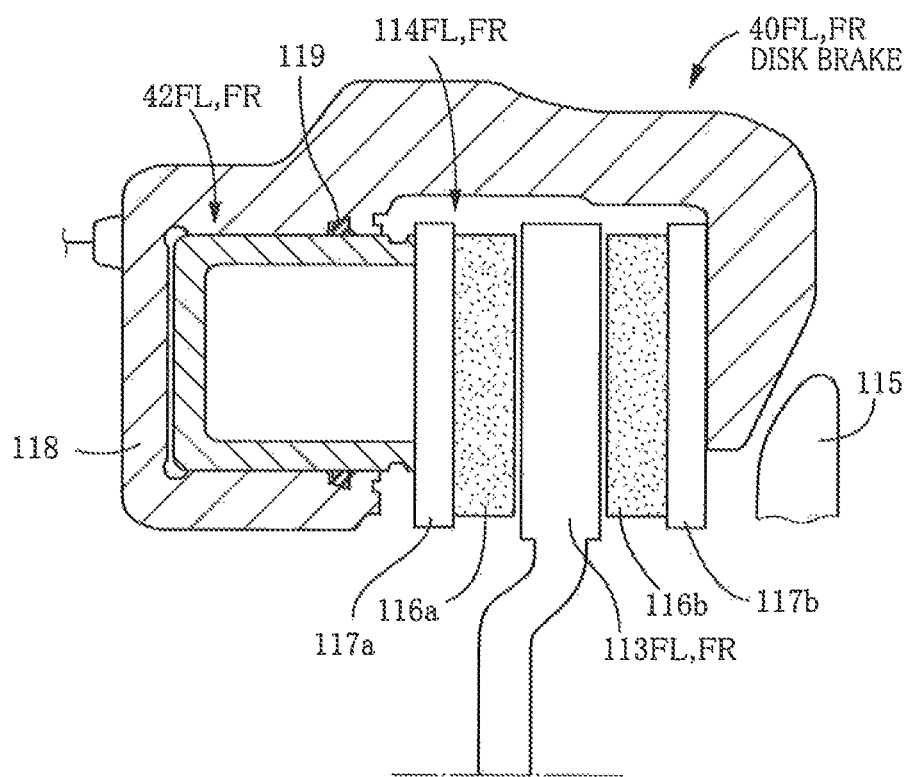
FIG. 3 is a cross sectional view (schematic view) of a disk brake included in the above-described brake hydraulic pressure circuit.

The hydraulic brakes 40FL, 40FR provided for the respective front left and right wheels 2, 4 are disk brakes as shown in FIG. 3.

The disk brakes 40FL, 40FR include rotary disks 113FL, 113FR rotatable integrally with the respective front wheels 2, 4, and pressing devices 114FL, 114FR configured to press frictional engagement members against the respective rotary disks 113FL, 13FR. Each of the pressing devices 114FL, 114FR includes (i) brake pads 116a, 116b and backing plates 117a, 117b as the frictional engagement members and (ii) a caliper 118 as a driving device. The brake pads 116a, 116b and the backing plates 117a, 117b are held by a mounting bracket 115 as a non-rotary body, so as to be opposed to opposite frictional surfaces of a corresponding one of the rotary disks 113FL, 113FR. The caliper 118 is disposed to straddle over the rotary disk 113, and holds the brake cylinder 42.

With supply of the hydraulic pressure to each of the brake cylinders 42, the brake pad 116a is pressed against one of the opposite frictional surfaces of the rotary disk 113, and the caliper 118 is moved in an axial direction relative to the mounting bracket 115 whereby the brake pad 116b is pressed against the other of the opposite frictional surfaces of the rotary disk 113. In this instance, the caliper 118 is elastically deformed, and the brake pads 116a, 116b are elastically deformed. Thus, the disk brake 40 is placed in its activated state whereby rotation of a corresponding one of the front wheels 2, 4 is restrained. Further, by controlling the hydraulic pressure of the brake cylinder 42, a pressing force applied from each of the brake pads 116a, 116b to the rotary disk 113 is controlled.

When the disk brake 40 is to be released, a piston of the brake cylinder 42 is returned owing to a force restoring the elastic deformation of each of the brake pads 116a, 116b and the caliper 118 and a force restoring the elastic deformation of a piston seal 119, whereby the brake pads 116a, 116b are separated from the rotary disk 113.

Figure 4:
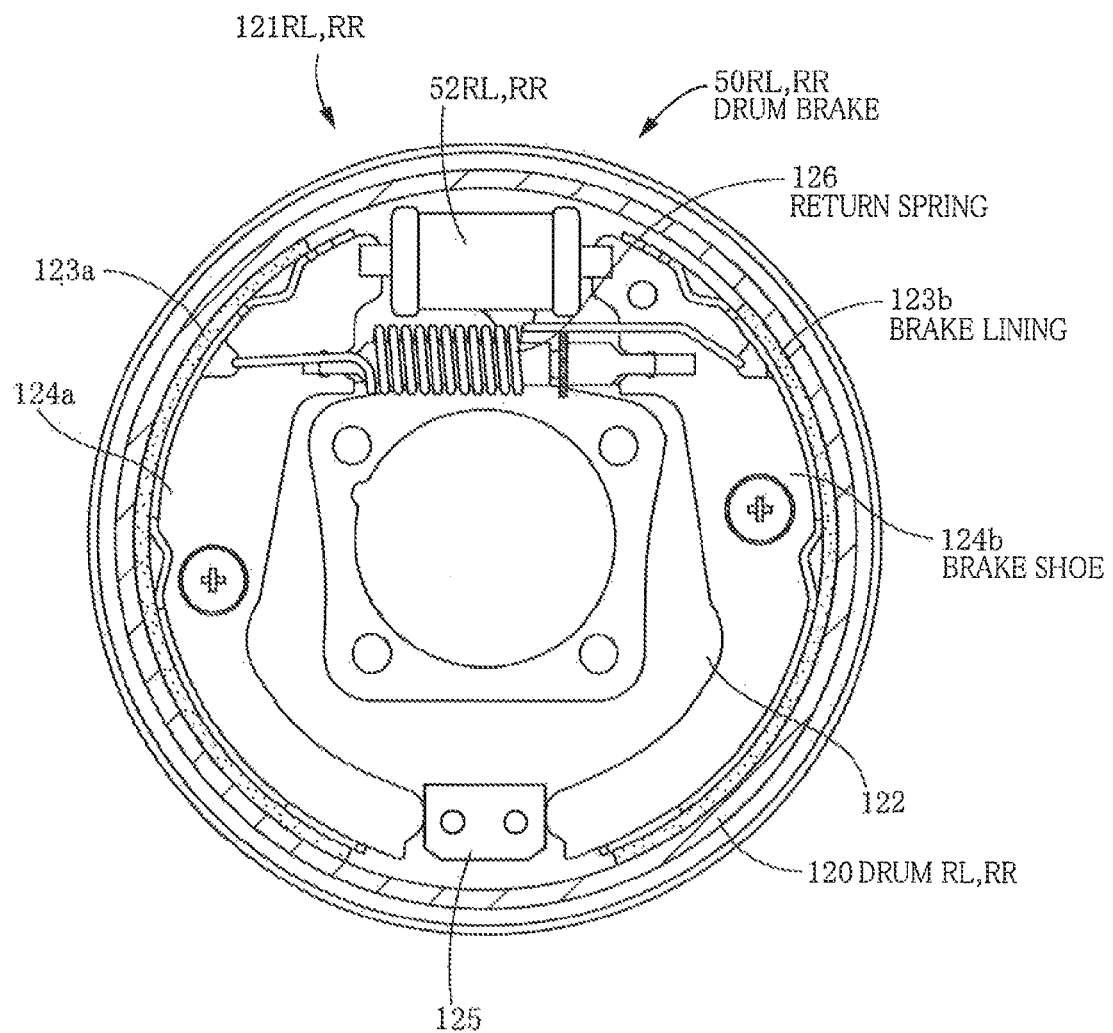
FIG. 4 is a cross sectional view (schematic view) of a drum brake included in the above-described brake hydraulic pressure circuit.

The hydraulic brakes 500RL, 50RR provided for the respective rear left and right wheels 46, 48 are drum brakes as shown in FIG. 4.

The drum brakes 50RL, 50RR include drums 120RL, 120RR rotatable integrally with the respective rear wheels 46, 48, and pressing devices 121RL, 121RR configured to press frictional engagement members against the respective drums 120RL, 120RR. Each of the pressing devices 121RL, 121RR includes (i) a pair of shoes 124a, 124b that are held by a backing plate 122 as a non-rotary body so as to be disposed on an inner peripheral side of a corresponding one of the drums 120RL, 120RR, (ii) the brake cylinder 62 as a driving device that is configured to move the shoes 124a, 124b away from each other so as to spread the shoes 124a, 124b and (iii) an anchor 125 that is fixed to a backing plate 122 as a non-rotary body. The pair of shoes 124a, 124b are provided with respective frictional engagement members 123a, 123b that are disposed on outer peripheral sides of the respective shoes 124a, 124b.

With supply of the hydraulic pressure to each of the brake cylinders 52, the pair of shoes 124a, 124b are moved away from each other while being held in contact with the anchor 125, whereby the frictional engagement members 123a, 123b are pressed against an inner circumferential surface of the drum 120 so as to be brought in frictional engagement with the drum 120. Thus, the drum brake 50 is placed in its activated state whereby rotation of a corresponding one of the wheels 46, 48 is restrained.

When the drum brake 50 is to be released, the pair of brake shoes 124a, 124b are moved toward each other by a return spring 126 so as to reduce a diameter defined by the shoes 124a, 124b, whereby the frictional engagement members 123a, 123b are separated from the drum 120.

c) Slip-Control Valve Device

The individual passages 112FL, 112FR, 112RL, 112RR are provided with respective holding valves (SHij: i=F, R; j=L, R) 130FL, 130FR, 130RL, 130RR. Between the brake cylinders 42FL, 42FR, 52RL, 52RR and the reservoir 82, there are disposed pressure reducing valves (SRij: i=F, R; j=L, R) 131FL, 131FR, 131RL, 131RR.

In the present embodiment, each of the pressure holding valves 130 is constituted by a normally-open electromagnetic on-off valve, while each of the pressure reducing valves 131 is constituted by a normally-closed electromagnetic on-off valve. The pressure holding valves 130 and pressure reducing valves 131 are used for a slip control such as an antilock control, a traction control and a vehicle stability control. A slip-control valve device 133 is constituted by, for example, the pressure holding valves 130 (as examples of pressure-increasing individual control valves) and the pressure reducing valves 131 (as examples of pressure-reducing individual control valves).

With the slip-control valve device 133 being controlled, the hydraulic pressures of the brake cylinders provided for the wheels, which are subjected to the control, are controlled independently of each other.

d) Regarding Periphery of Common Passage

The common passage 110 is provided with a separate valve 134 that is disposed between a front-wheel-side passage portion 135f and a rear-wheel-side passage portion 135r of the common passage 110. The individual passages 112FL, 112FR that are connected to the brake cylinders 42FL, 42FR for the front left and right wheels 2, 4, and the booster passage 92 are connected to the front-wheel-side passage portion 135f. The individual passages 112RL, 112RR that are connected to the brake cylinders 52RL, 52RR for the rear left and right wheels 46, 48, the master passage 94, and the high pressure passage 90 are connected to the rear-wheel-side passage portion 135r.

By selectively opening and closing the separate valve 134, the front-wheel-side passage portion 135f and the rear-wheel-side passage portion 135r are selectively communicated to and isolated from each other. It is noted that the separate valve 134 is constituted by a normally-closed electromagnetic on-off valve.

The high pressure passage 90, which connects the power hydraulic pressure source 64 and the common passage 110, is provided with an accumulator cutoff valve 136 (as an example of a power-hydraulic-pressure-source cutoff valve). The master passage 94, which connects the pressurizing chamber 74 of the master cylinder 70 and the common passage 110, is provided with a master cutoff valve 138. The booster passage 92, which connects the booster chamber 78b of the hydraulic pressure booster 68 and the common passage 110, is provided with a first common hydraulic-pressure control valve 140. Between the common passage 110 and the reservoir 82, there is provided a second common hydraulic-pressure control valve 142. The first common hydraulic-pressure control valve 140 is an example of a first hydraulic pressure control valve, and functions also as a hydraulic-pressure-booster cutoff valve. Hereinafter, the first common hydraulic-pressure control valve 140 will be referred to as a hydraulic-pressure-booster cutoff valve 140 where the first common hydraulic-pressure control valve 140 functions as the hydraulic-pressure-booster cutoff valve. The second common hydraulic-pressure control valve 142 is an example of a pressure-reducing electromagnetic hydraulic-pressure control valve.

The accumulator cutoff valve 136 is constituted by a normally-closed electromagnetic on-off valve, while the master cutoff valve 138 is constituted by a normally-open electromagnetic on-off valve.

e) Common Hydraulic-Pressure Control Valve Device

Each of the first common hydraulic-pressure control valve 140 and the second common hydraulic-pressure control valve 142 is constituted by an electromagnetic linear valve that is capable of continuously controlling a magnitude of the output hydraulic pressure, by continuously controlling an electric current supplied to a coil of a solenoid of the valve.

The electromagnetic linear valve constituting the first common hydraulic-pressure control valve 140 is a normally-open electromagnetic valve. The electromagnetic linear valve constituting the second common hydraulic-pressure control valve 142 is a normally-closed electromagnetic valve.

Figures 5A, 5B:
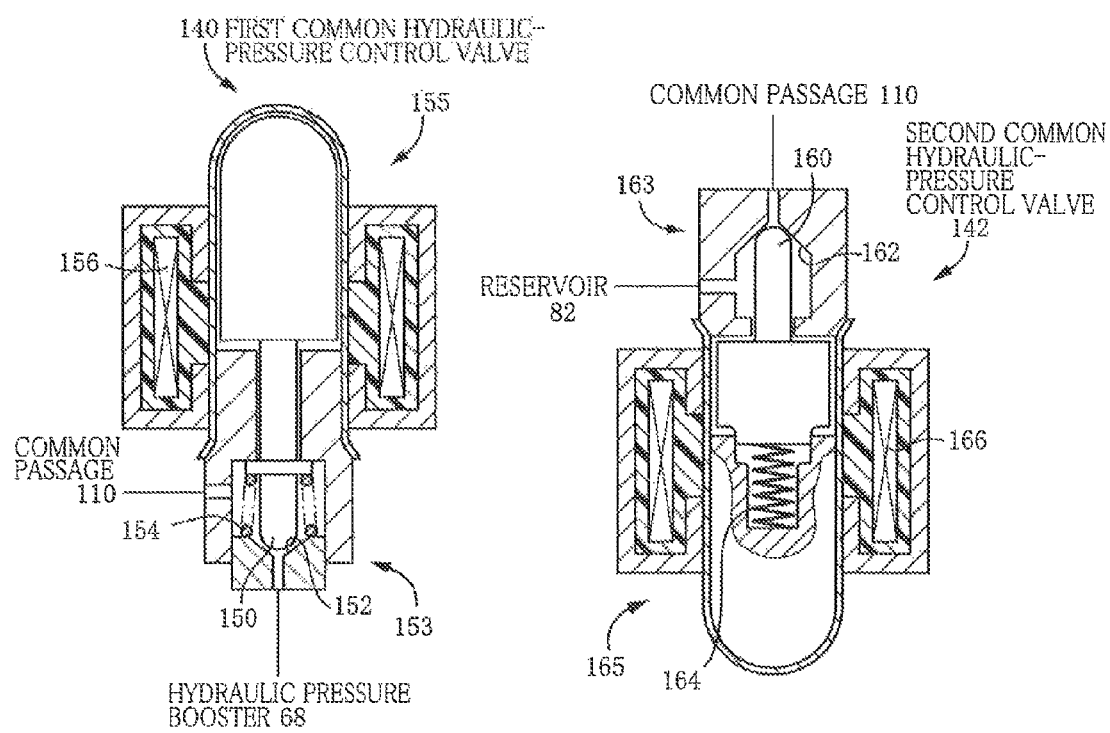
FIGS. 5A and 5B are cross sectional views of a pressure-increasing linear control valve and a pressure-reducing linear control valve that are included in the above-described brake hydraulic pressure circuit.

As shown in FIG. 5A, the first common hydraulic-pressure control valve 140 includes a seating valve 153, a spring 154 and a solenoid 155. The seating valve 153 is constituted by a valve element 150 and a valve seat 152. The spring 154 generates a biasing force F1 forcing the valve element 150 in a direction away from the valve seat 152. The solenoid 155, when an electric current is being applied thereto, generates an electromagnetic driving force F2 forcing the valve element 150 in a direction toward the valve seat 122. Further, the first common hydraulic-pressure control valve 140 is disposed with its posture that causes a pressure-difference-based force F3, which is generated based on a difference between the hydraulic pressure of the booster chamber 78*b* and the hydraulic pressure of the common passage 110, to act on the valve element 150 (F2: F1+F3). In the first common hydraulic-pressure control valve 140, the pressure-difference-based force F3 is controlled by controlling an electric current supplied to a coil 156 of the solenoid 155, whereby the hydraulic pressure of the common passage 110 is controlled. The hydraulic pressure of the common passage 110 is controlled to be increased, by reducing the hydraulic pressure of the booster chamber 78*b* and supplying the reduced hydraulic pressure to the common passage 110. When the hydraulic pressure of the common passage 110 is higher than the hydraulic pressure of the booster chamber 78*b*, the hydraulic pressure of the common passage 110 is returned to the booster chamber 78*b* whereby the hydraulic pressure of the common passage 110 is controlled to be reduced.

As shown in FIG. 5B, the second common hydraulic-pressure control valve 142 includes a seating valve 163, a spring 164 and a solenoid 165. The seating valve 163 is constituted by a valve element 160 and a valve seat 162. The spring 164 generates a biasing force F1 forcing the valve element 160 in a direction toward the valve seat 162. The solenoid 165, when an electric current is being applied thereto, generates an electromagnetic driving force F2 forcing the valve element 160 in a direction away from the valve seat 162. Further, a pressure-difference-based force F3, which is generated based on a difference between the hydraulic pressure of the common passage 110 and the hydraulic pressure of the reservoir 82, is caused to act on the valve element 160 in a direction causing the valve element 160 to be separated from the valve seat 162 (F2+F3: F1). In the second common hydraulic-pressure control valve 142, the pressure-difference-based force F3 is controlled by controlling an electric current supplied to a coil 166 of the solenoid 165, whereby the hydraulic pressure of the common passage 110 is controlled to be reduced.

A common hydraulic-pressure control valve device 168 is constituted by, for example, the first common hydraulic-pressure control valve 140 and the second common hydraulic-pressure control valve 142.

<Brake ECU>

The hydraulic pressure controlling portion 54 is constituted by, for example, the above-described power hydraulic pressure source 64 (including the pump motor 102), first common hydraulic-pressure control valve 140, second common hydraulic-pressure control valve 142, accumulator cut-off valve 136, master cutoff valve 138, pressure holding valves 130 and pressure reducing valves 131. The hydraulic pressure controlling portion 54 is controlled based on command of the brake ECU 56.

The brake ECU 56 is constituted mainly by a computer including an executing portion 170, an input/output portion 171 and a memory portion 173, as shown in FIG. 1. To the input/output portion 171, there are connected, for example, a brake switch 218, a stroke sensor 220, a manual hydraulic-pressure sensor 222, an accumulator hydraulic-pressure sensor 224, a common hydraulic-pressure sensor 226, wheel velocity sensors 230 and the above-described hydraulic pressure controlling portion 54.

The brake switch 218 is configured to detect whether or not the brake pedal 60 is being in its operated state. For example, the brake switch 218 is in its ON state when the brake pedal 60 is being operated.

The stroke sensor 220 is configured to detect an operating stroke (STK) of the brake pedal 60. In the present embodiment, the stroke sensor 160 is constituted by two sensors for a fail-safe purpose. The two sensors detect the operating stroke (STK1, SKT2) of the brake pedal 60 in substantially the same manner.

The manual hydraulic-pressure sensor 222 is configured to detect the hydraulic pressure corresponding to an operating force that is applied to the brake pedal 60 by the vehicle operator. In the present embodiment, the manual hydraulic-pressure sensor 222 detects the hydraulic pressure of the pressurizing chamber 74 of the master cylinder 70.

The accumulator hydraulic-pressure sensor 224 is configured to detect a pressure (PACC) of the working fluid stored in the accumulator 66.

The common hydraulic-pressure sensor 226 is provided in the front-wheel-side passage portion 135*f* of the common passage 110, and is configured to detect the hydraulic pressure of the common passage 110. When each of the pressure holding valves 130 is in its open state, a corresponding one of the brake cylinders 42, 52 is in communication with the common passage 110, so that the hydraulic pressure of the common passage 110 can be regarded as the hydraulic pressure of the corresponding one of the brake cylinders 42, 52. Further, when the separate valve 134 is in its closed state, the hydraulic pressure of each of the brake cylinders 42 provided for the respective front left and right wheels 2, 4 is detected by the common hydraulic-pressure sensor 226.

Each of the wheel velocity sensors 230 is provided for a corresponding one of the respective front left and right wheels 2, 4 and rear left and right wheels 46, 48, and is configured to detect a rotational velocity of the corresponding wheel. A running velocity of the vehicle is obtained based on the rotational velocities of the four wheels.

The memory portion 173 stores therein various programs and tables, for example.

<Operations in Hydraulic Brake System>

In the present hydraulic brake system, the supply of the hydraulic pressure to the common passage 110 from each of the power hydraulic pressure source 64, master cylinder 70 and hydraulic pressure booster 68 is controlled, the hydraulic pressure of the common passage 110 is controlled, and the hydraulic pressure of each of the brake cylinders 42, 52 (i.e. the supply of the hydraulic pressure to each of the brake cylinders 42, 52) is controlled.

In the present embodiment, the electromagnetic valves are controlled so as to establish a selected one of at least modes A, B, C, D and E, as shown in FIG. 6.

a) Control of Supply of Hydraulic Pressure

Figure 7:
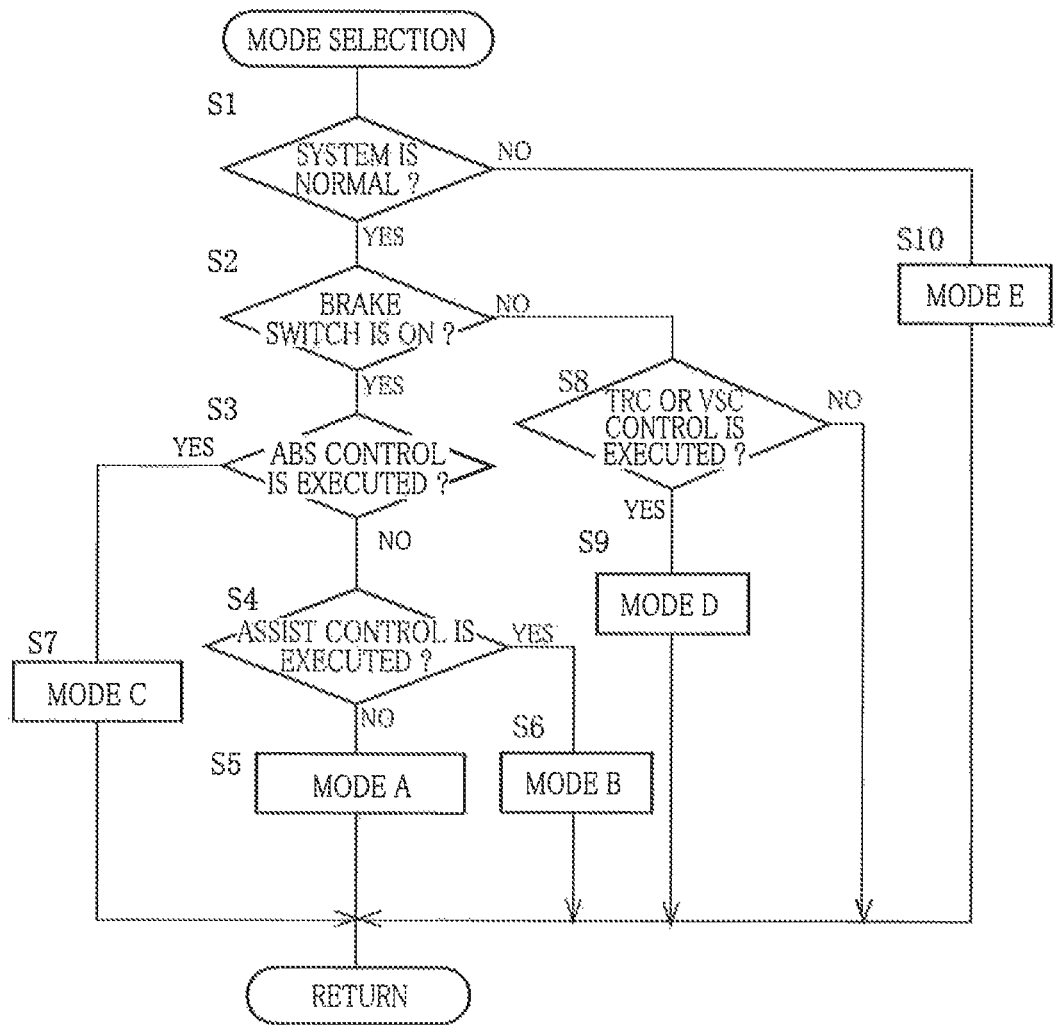
FIG. 7 is a flow chart representing a hydraulic-pressure supply control program stored in a memory portion of a brake ECU that is included in the above-described hydraulic brake system.

FIG. 7 is a flow chart representing a mode selection program that is executed at a predetermined time interval.

The execution of this mode selection program is initiated with step 1 (hereinafter abbreviated to as "S1" as well as the other steps) that is implemented to judge whether the system is normal or not. In S2, it is judged whether the brake switch 218 is in its ON state or not. In S3, it is judged whether an antilock control is being executed or not.

When the antilock control is not being executed with the brake switch 218 being in its ON state, S4 is implemented to judge whether a brake assist control is being executed or not. When the brake assist control is being not executed, S5 is implemented to select the mode A. When the brake assist control is being executed, S6 is implemented to select the mode B. When the antilock control is being executed, S7 is implemented to select the mode C.

On the other hand, a traction control or a vehicle stability control is being executed with the brake switch 218 being in its OFF state, a negative judgment (NO) is obtained in S2 and a positive judgment (YES) is obtained in S8, whereby S9 is implemented to select the mode 1). When the system is not normal, a negative judgment (NO) is obtained in S1 whereby S10 is implemented to select the mode E.

In the present embodiment, the phrase that "the system is normal" may be interpreted to mean a state in which a hybrid system is normal and the hydraulic pressure control can be normally executed in the hydraulic brake system. For example, it is regarded that the hydraulic brake system is normal (more strictly, it is regarded that the control system is normal), in a case when the first and second common hydraulic-pressure control valves 140, 142 are normally operable, the sensors such as the sensor 220 are normal and the hydraulic pressure stored in the accumulator 66 is within a given range.

Further, the judgment as to whether each of the antilock control, brake assist control, traction control and vehicle stability control is being executed or not, is made by detecting whether a corresponding one of an antilock-control execution flag (ABS flag), a brake-assist-control execution flag (BA flag), a traction-control execution flag (TRC flag) and a vehicle-stability-control execution flag (VSC flag) is being set or not. These flags will be described in description of the modes.

Hereinafter, the modes will be described.

b) Mode A

The mode A is selected in a case of a normal braking. The case of the normal braking may be interpreted to mean a case when a control such as the brake assist control and the antilock control is not executed during operation of the brake pedal 60. In the present embodiment, in principle, a regenerative cooperative control is executed.

Figure 12:
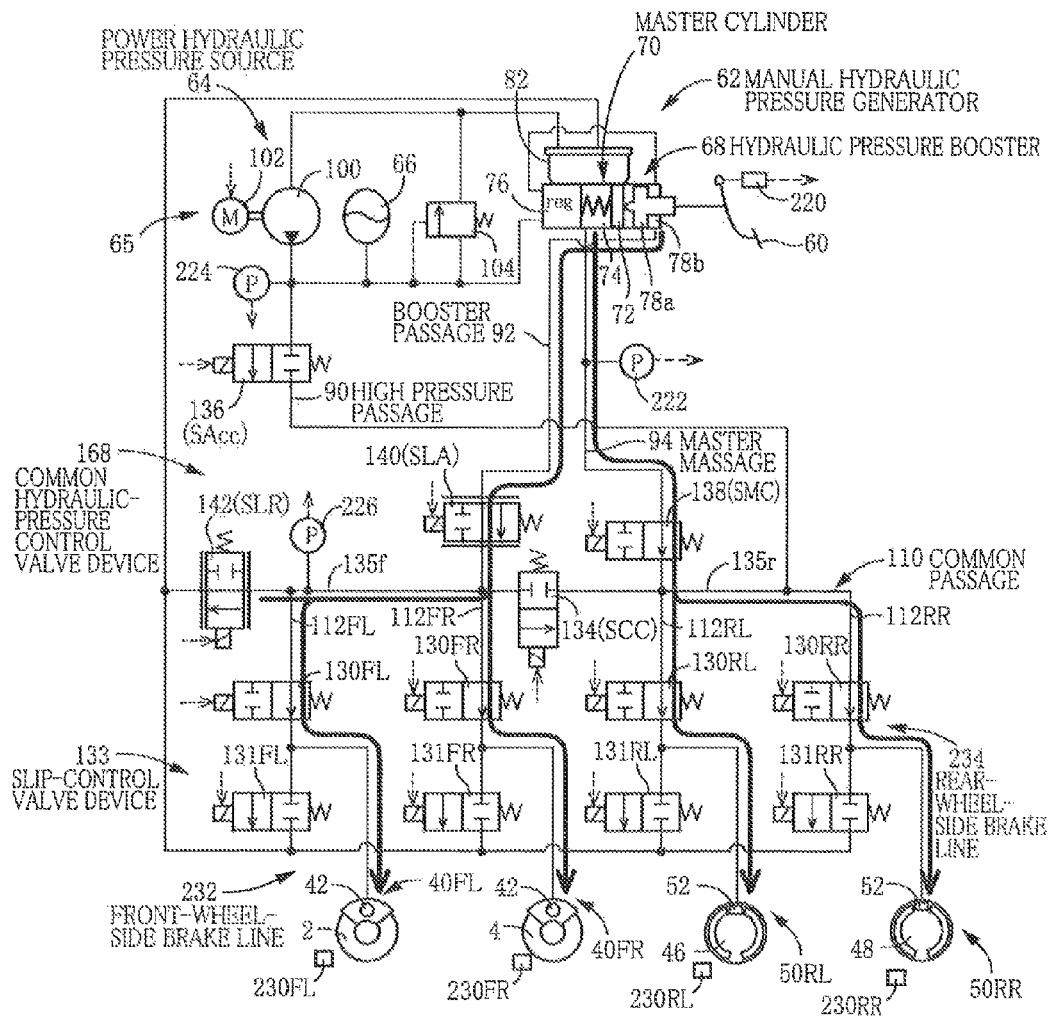
FIG. 12 is a view showing supply of a working fluid in a case when mode A is selected by execution of the above-described hydraulic-pressure supply control program.

When the mode A is selected, as shown in FIGS. 6 and 12, the separate valve 134 is placed in its closed state (Shut), the master cutoff valve 138 is placed in its open state (Open), and the accumulator cutoff valve 136 is placed in its closed state (Shut), while an electric current supplied to each of the coils 156, 166 of the respective solenoids 155, 156 of the respective first and second common hydraulic-pressure control valves 140, 142 is controlled. Further, upon selection of the mode A, all of the pressure holding valves 130 are placed in their open states while all of the pressure reducing valves 131 are placed in their closed states.

With the separate valve 134 being placed in its closed state, the brake cylinders 42 for the front left and right wheels 2, 4 are isolated from the brake cylinders 52 for the rear left and right wheels 46, 48, and the brake line 232 for the front wheels and the brake line 234 for the rear wheels become independent of each other.

The brake line 232 for the front wheels is constituted by, for example, the hydraulic pressure booster 68, booster passage 92, front-wheel-side passage portion 135f, individual passages 112FL, 112FR and brake cylinders 42FL, 42FR. The brake line 234 for the rear wheels is constituted by, for example, the master cylinder 70, master passage 94, rear-wheel-side passage portion 135r, individual passages 112RL, 112RR and brake cylinders 52RL, 52RR.

The brake line 232 for the front wheels corresponds to one of the two brake lines. The front-wheel-side passage portion 135f corresponds to a first passage portion. Each of the brake cylinders 42FL, 42FR corresponds to a first brake cylinder. The brake line 234 for the rear wheels corresponds to the other of the two brake lines. The rear-wheel-side passage portion 135r corresponds to a second passage portion. Each of the brake cylinders 52RL, 52RR corresponds to a second brake cylinder.

b-1) Regenerative Cooperative Control

Figure 8:
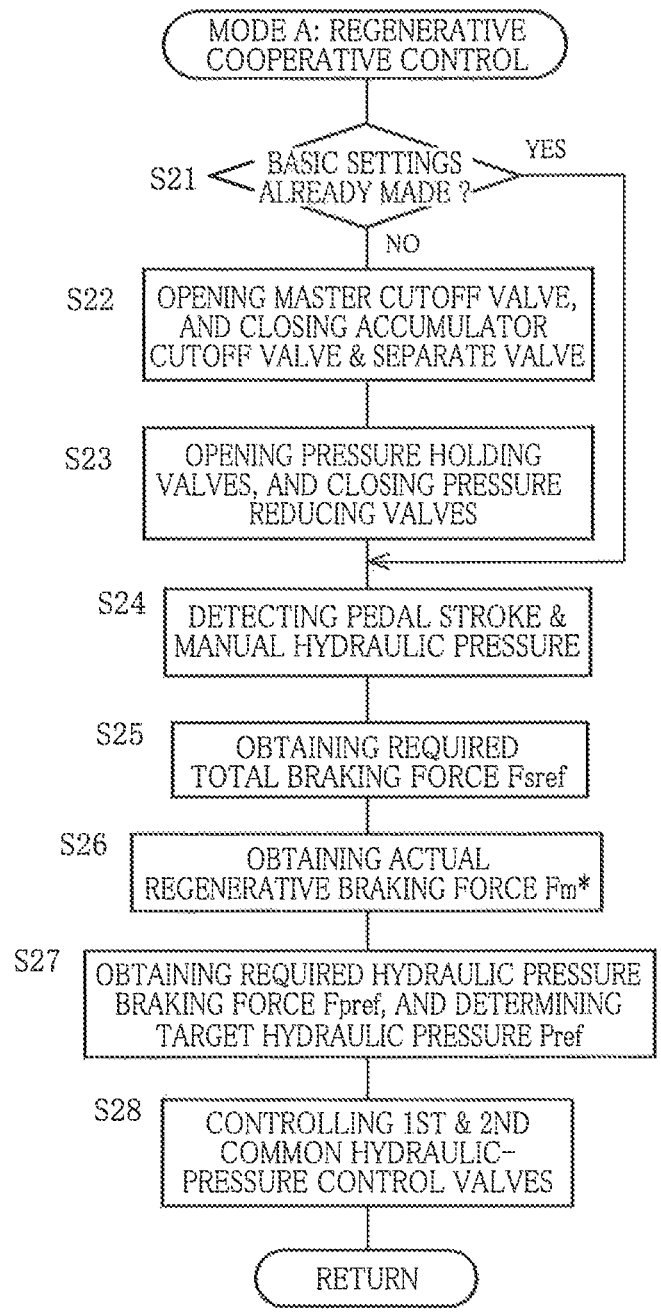
FIG. 8 is a flow chart representing a regenerative-cooperative control program stored in the above-described memory portion.

FIG. 8 is a flow chart representing a regenerative-cooperative control program that is to be executed when the mode A is selected.

In the regenerative cooperative control, the hydraulic pressure of the brake cylinder 42 provided for each disk brake 40 is controlled such that an actual total braking force Fs* including an actual regenerative braking force Fm* and an actual hydraulic pressure braking force Fp* becomes close to a required total braking force Fsref that is required by the vehicle operator.

The regenerative-cooperative control program is initiated by S21 that is implemented to judge whether basic settings required for the mode A have been made or not. When this control program is executed for the first time, the basic settings required for the mode A have not yet been made, so that S22 is implemented to place the master cutoff valve 138 into its open state and to place the accumulator cutoff valve 136 and the separate valve 134 into their closed states, and then S23 is implemented to place all of the pressure holding valves 130 into theirs open states and to place all of the pressure reducing valves 131 into their closed states.

Under these states (being established by the basis settings), the first and second common hydraulic-pressure control valves 140, 142 are controlled.

When this control program is executed after the execution for the first time, S24 and steps following S24 are implemented without implementations of S22 and 823, because the basic settings have been already completed.

In S24, an operating stroke of the brake pedal 60 and the manual hydraulic pressure are detected by the stroke sensor 220 and the manual hydraulic-pressure sensor 222, respectively. In S25, the required total braking force Fsref is obtained based on the values detected in S24.

In the hybrid ECU 48, a outputtable maximum value of the regenerative braking force is obtained based on, for example, the required total braking force FSref and a condition of the storage device 22, and then a required regenerative braking force Fmref is determined. Then, an inverter is controlled by the motor ECU 18 for obtaining the required regenerative braking force Fmref. Further, the actually obtained regenerative braking force Fm* is detected.

In S26, the brake ECU56 obtains the actual regenerative braking force Fm* via the CAN 59. In S27, the required hydraulic pressure braking force Fpref for each of the front left and right wheels 2, 4 is obtained by calculation such that the required total braking force Fsref is satisfied by the actual total braking force Fs* including the actual regenerative braking force Fm* and the total Fp* that is a sum of the actual hydraulic pressure braking forces for the front left and right wheels 2, 4 and rear left and right wheels 46, 48. Then, a target hydraulic pressure Pref of each of the brake cylinders 42 is determined.

In S28, the first and second common hydraulic-pressure control valves 140, 142 are controlled in a feed-back manner or feed-forward manner, such that the actual hydraulic pressure of the common passage 110 that corresponds to a value detected by the common hydraulic-pressure sensor 226 becomes close to the target hydraulic pressure Pref.

A difference between the hydraulic pressure on one of opposite sides of the first common hydraulic-pressure control valve 140 and the hydraulic pressure on the other of the opposite sides of the first common hydraulic-pressure control valve 140 is obtained as a difference between the value (i.e., the hydraulic pressure of the common passage 110) detected by the common hydraulic-pressure sensor 226 and the hydraulic pressure of the booster chamber 78b that is estimated based on the value detected by the manual hydraulic-pressure sensor 226. A difference between the hydraulic pressure on one of opposite sides of the second common hydraulic-pressure control valve 142 and the hydraulic pressure on the other of the opposite sides of the second common hydraulic-pressure control valve 142 corresponds to the hydraulic pressure of the common passage 110.

To the brake cylinders 52 for the rear left and right wheels 46, 48, the hydraulic pressure of the pressurizing chamber 74 of the master cylinder 70 is supplied as is. In other words, the hydraulic pressure of each of the brake cylinders 52 is, in principle, made the same as the hydraulic pressure of the pressurizing chamber 74 in magnitude. The hydraulic pressure of the pressurizing chamber 74 is supplied to each of the brake cylinders 52, without the hydraulic pressure being particularly controlled. The master cutoff valve 138, which is provided between the pressurizing chamber 74 and each of the brake cylinders 52, is in its open state.

b-2) Effects (i) No Stroke Simulator

In the mode A, since the master cutoff valve 138 is in its open state, the pressurizing chamber 74 is in communication with the brake cylinders 52RL, 52RR of the drum brakes 50RL, 50RR. Therefore, even without provision of a stroke simulator, it is possible to restrain reduction of a feeling given to the vehicle operator who operates the brake operating member. In other words, the necessity of provision of the stroke simulator in the hydraulic brake system can be eliminated whereby the cost can be reduced.

Further, owing to the elimination of the stroke simulator, the hydraulic brake system can be made compact in size and light in weight whereby a fuel efficiency (that represents a running distance of the vehicle by consumption of a certain amount of a fuel, and may be defined by a level-road fuel efficiency, a mode fuel efficiency or the like) can be improved.

(ii) Drum Brake

Since the drum brake 50 is more inexpensive than the disk brake 40, the provisions of the drum brakes 50 for the rear left and right wheels 46, 48 make it possible to reduce a cost of the hydraulic brake system, as compared with a case where the disk brakes 40 are provided for the four wheels.

Further, in the drum brake 50, upon brake release, the frictional engagement members 123a, 123b are satisfactorily separable from the brake rotary body (i.e., drum) 120, owing to the return spring 126. Therefore, a brake dragging is more unlikely to be caused as compared with a case of the disk brake 40, so that a fuel efficiency can be improved.

Additionally, since the hydraulic pressure of the master cylinder 70 is supplied as is to the brake cylinders 52RL, 52RR provided for the rear left and right wheels 46, 48, the hydraulic pressure braking force applied to each of the rear wheels 46, 48 cannot be made smaller than a braking force corresponding to the hydraulic pressure of the master cylinder 70. Therefore, there is a case when an outputtable regenerative braking torque is subjected to a limitation. However, by taking account of employments of the drum brakes 50 which lead to improvement in the fuel efficiency owing to, for example, the reduction in the weight and the reduction in the brake dragging, it is possible to obtain substantially the same fuel efficiency level as in a conventional hydraulic brake system (i.e., system in which the hydraulic pressures in the brake cylinders for four wheels are controlled in a regenerative cooperative control).

Figure 22:
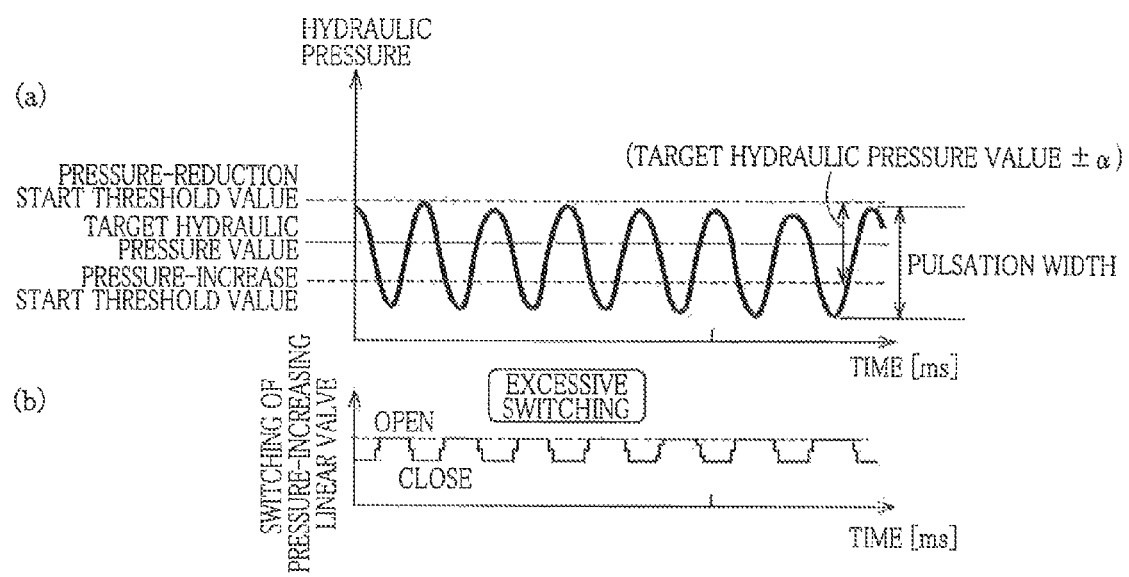
FIG. 22 is a view showing change of a hydraulic pressure of a brake cylinder in relation with an operational state of a hydraulic pressure control valve, in a case where a drum brake is applied to a conventional hydraulic brake system.

(iii) Problem Due to Employment of Drum Brake 50 and Measure for Solving the Problem In a drum brake, a so-called pulsation is caused in the hydraulic pressure of the brake cylinder, namely, the hydraulic pressure of the brake cylinder fluctuates periodically with rotation of a drum, as shown in FIG. 22 (*a*) in a case where the drum is attached eccentrically or in a case where the drum has a low degree of roundness. In a case when the amplitude of the pulsation is larger than a control dead zone width (target hydraulic pressure value±α) or in a case when the pulsation is caused in the neighborhood of a pressure-increase start threshold value or a pressure-reduction start threshold value, opening and closing of a pressure-increasing control valve or a pressure-reducing control valve are repeated whereby a control hunting is caused. FIG. 22 (*b*) shows an example in which a pressure increase mode and a pressure hold mode are alternately established whereby opening and closing of the pressure-increasing control valve are repeated in a case when the pulsation is caused in the neighborhood of the pressure-increase start threshold value, whereby the control hunting is caused.

Meanwhile, in a disk brake, a pulsation is hardly caused owing to its structure. The pulsation could be caused, for example, when a rotor has been partially worn. However, an amplitude of the pulsation is small.

On the other hand, in the present embodiment, since the separate valve 134 is in its closed state, the common hydraulic-pressure sensor 226 used for controlling the common hydraulic-pressure control valve device 168 is isolated from the brake cylinders 52RL, 52RR of the drum brakes 50RL, 50RR. Consequently, the pulsation caused in the drum brake 50RL, 50RR does not affect the control performed for each of the first and second common hydraulic-pressure control valves 140, 142, so that it is possible to restrain occurrence of the control hunting. Further, by restraining occurrence of the control hunting, it is possible to reduce a frequency of switching operation of each of the first and second common hydraulic-pressure control valves 140, 142 and to accordingly increase the service life.

Further, since the brake cylinders 52 of the drum brakes 50 are in communication with the master cylinder 70, the pulsation caused in the drum brakes 50 can be absorbed by operation of the brake pedal 60 that is performed by the vehicle operator. Thus, it is possible to restrain increase of vibrations in the drum brakes 50.

(iv) Running Stability

In the mode A, the hydraulic pressure of the master cylinder 70 is supplied as is to the brake cylinders 52RL, 52RR provided for the rear left and right wheels 46, 48, so that the hydraulic pressure corresponding to the required total braking force Fsref is supplied to the brake cylinders

52RL, 52RR. Meanwhile, the hydraulic pressure of the booster chamber 78b is controlled to be reduced, and is supplied to the brake cylinders 42FL, 42FR provided for the front left and right wheels 2, 4, so that the hydraulic pressure of each of the brake cylinders 42FL, 42FR is made lower than the hydraulic pressure (i.e., pressure of the master cylinder 70) of each of the brake cylinders 52RL, 52RR provided for the rear left and right wheels.

Figure 16:
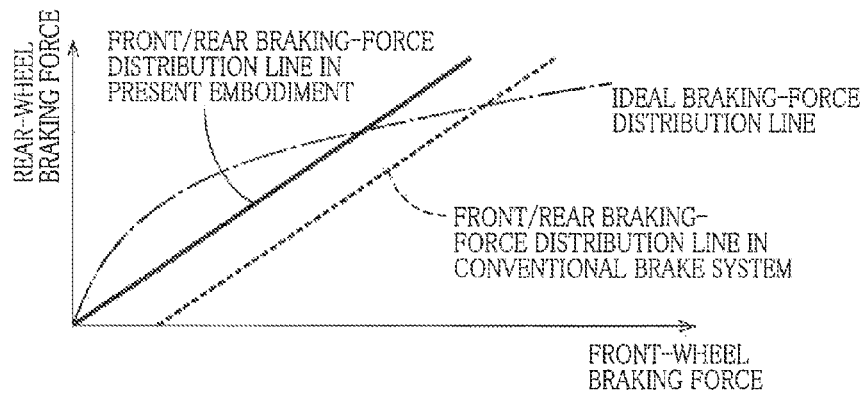
FIG. 16 is a view showing a relationship between a front-wheel braking force and a rear-wheel braking force in a case when the above-described regenerative-cooperative control program is executed.

On the other hand, in the conventional hydraulic brake system, the hydraulic pressures of the brake cylinders provided for the front left and right and rear left and right wheels are controlled to be equal in magnitude. Therefore, in the conventional hydraulic brake system, the actual total braking force Fsf* (including the regenerative braking torque and the hydraulic pressure braking torque) applied to each of the front wheels 2, 4 is made larger than the actual hydraulic pressure braking force Fpr* applied to each of the rear wheels 46, 48, so that a relationship between a front-wheel braking force and a rear-wheel braking force is established as indicated by broken line in FIG. 16.

However, in the present embodiment, the hydraulic pressure of each of the brake cylinders 42FL, 42FR provided for the front left and right wheels 2, 4 is made lower than the hydraulic pressure of each of the brake cylinders 52RL, 52RR provided for the rear left and right wheels 46, 48. Therefore, in the present embodiment, as compared with the case of the conventional hydraulic brake system, the braking force applied to each of front left and right wheels 2, 4 is made smaller than the braking force applied to each of the rear left and right wheels 46, 48, so that a relationship between a front-wheel braking force and a rear-wheel braking force is established as indicated by solid line in FIG. 16.

Thus, in view of comparison between the front/rear braking-force distribution line (broken line) in the conventional hydraulic brake system and the front/rear braking-force distribution line (solid line) in the present embodiment, in a normal operation range, the relationship between the front-wheel braking force and the rear-wheel braking force in the embodiment can be closer to an ideal braking-force distribution line represented by one-dot chain line, as compared with the relationship in the conventional hydraulic brake system.

Consequently, it is possible to hardly cause an understeer tendency of the vehicle and to improve a running stability of the vehicle.

b-3) Others (i) There will be discussed an operation feeling.

In the present embodiment, since a stroke simulator is not provided, the operating stroke of the brake pedal 60 is allowed only in the master cylinder 70. Therefore, there is a possibility that the brake pedal 60 could be excessively deeply introduced, thereby possibly causing a problem in the operation feeling.

In such a case, it is possible to adjust a rod of the pressurizing piston 72 by adjusting an axial length of the master cylinder 70.

Further, it is possible to adjust a pedal ratio (i.e., (an amount of increase of the hydraulic pressure of the pressurizing chamber 74)/(an amount of increase of the stroke of the brake pedal 60)) or adjust a rigidity in each of the brake cylinders 52 (i.e., (an amount of increase of the hydraulic pressure of the brake cylinder 52)/(an amount of flow of the supplied working fluid)).

(ii) There will be discussed elimination of the second common hydraulic-pressure control valve (pressure-reduction linear control valve) 142.

In the regenerative cooperative control, the hydraulic pressure of each of the brake cylinders 42 is gradually increased in many cases. Therefore, in the regenerative cooperative control, the hydraulic pressure is not required to be controlled by the second common hydraulic-pressure control valve 142 in many cases, so that it also might be possible to consider that the second common hydraulic-pressure control valve 142 is not necessary.

Figure 17:
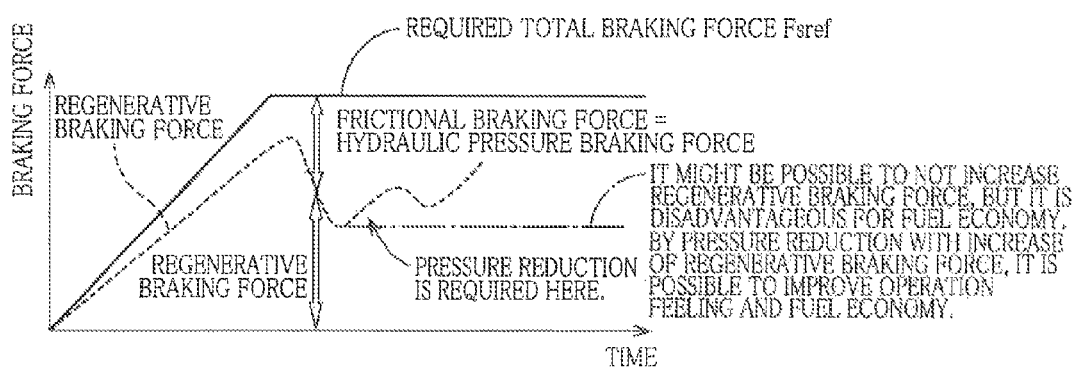
FIG. 17 is a view showing changes of a regenerative braking force and a hydraulic pressure braking force in a case when the above-described regenerative-cooperative control program is executed.

However, in the regenerative cooperative control, there is a case when the required hydraulic pressure braking force Fpref is reduced, and it is preferable that the hydraulic pressure of each of the brake cylinders 42 is controlled to be reduced in such a case. FIG. 17 shows a relationship between the regenerative braking force and the hydraulic pressure braking force in a case when the required total braking force Fpref is constant. In this FIG. 17, the required total braking force Fsref is represented by solid line, the regenerative braking force is represented by broken line, and the hydraulic pressure braking force as a frictional braking force is represented by a space defined between the solid line and the broken line. There is a case when the outputtable regenerative braking force is increased after having been reduced, as indicated by the broken line in FIG. 17. It can be considered that such an increase of the outputtable regenerative braking force is caused, for example, in a case when a volume stored in the storage device 22 is increased owing to temperature change or in a case when a kinetic energy amount supplied to the storage device 22 per unit time is increased owing to, for example, reduction of the vehicle running velocity. Thus, during execution of the regenerative cooperative control, when the outputtable regenerative braking force is increased, the required hydraulic pressure braking force Fpref is reduced thereby causing a necessity of reduction of the hydraulic pressure of each of the brake cylinders 42.

In this case, (x) it might be considered possible to hold the hydraulic pressure of each of the brake cylinders 42. However, if the hydraulic pressure of each of the brake cylinders 42 is held unchanged while the actual regenerative braking force Fm* is being increased, the actual total braking force Fs* becomes larger than the required total braking force Fsref, thereby reducing a brake feeling given to the vehicle operator.

Further, (y) it might be considered possible to not increase the actual regenerative braking force Fm*. However, it is not preferable from a point of view of an energy efficiency.

In view of the above-described circumstances, it is considered preferable that the second common hydraulic-pressure control valve 142 (i.e., control valve for reducing the hydraulic pressure of the common passage 110) is provided.

It is noted that it is also possible to employ an arrangement where at least one of the pressure reducing valves 130FL, 130FR is constituted by a linear control valve while the second common hydraulic-pressure control valve 142 is eliminated.

(iii) There will be discussed elimination of the stroke sensor 220.

The required total braking force Fsref requested by the vehicle operator can be obtained based on the value detected by the manual hydraulic-pressure sensor 222.

However, since the manual hydraulic-pressure sensor 222 is provided in the master passage 94, it is difficult to accurately obtain the intention of the vehicle operator when the master cutoff valve 138 is placed in its closed state.

It might be also considered possible to provide the manual hydraulic-pressure sensor 222 in the booster passage 92. However, a value detected by the manual hydraulic-pressure sensor 222 provided in the booster passage 92 is changed by control of the first common hydraulic-pressure control valve 140 in the regenerative cooperative control.

In view of the above-described circumstances, it is considered preferable that the stroke sensor 220 is provided.

c) Mode B

The mode B is selected in a case of execution of the brake assist control.

Figure 13:
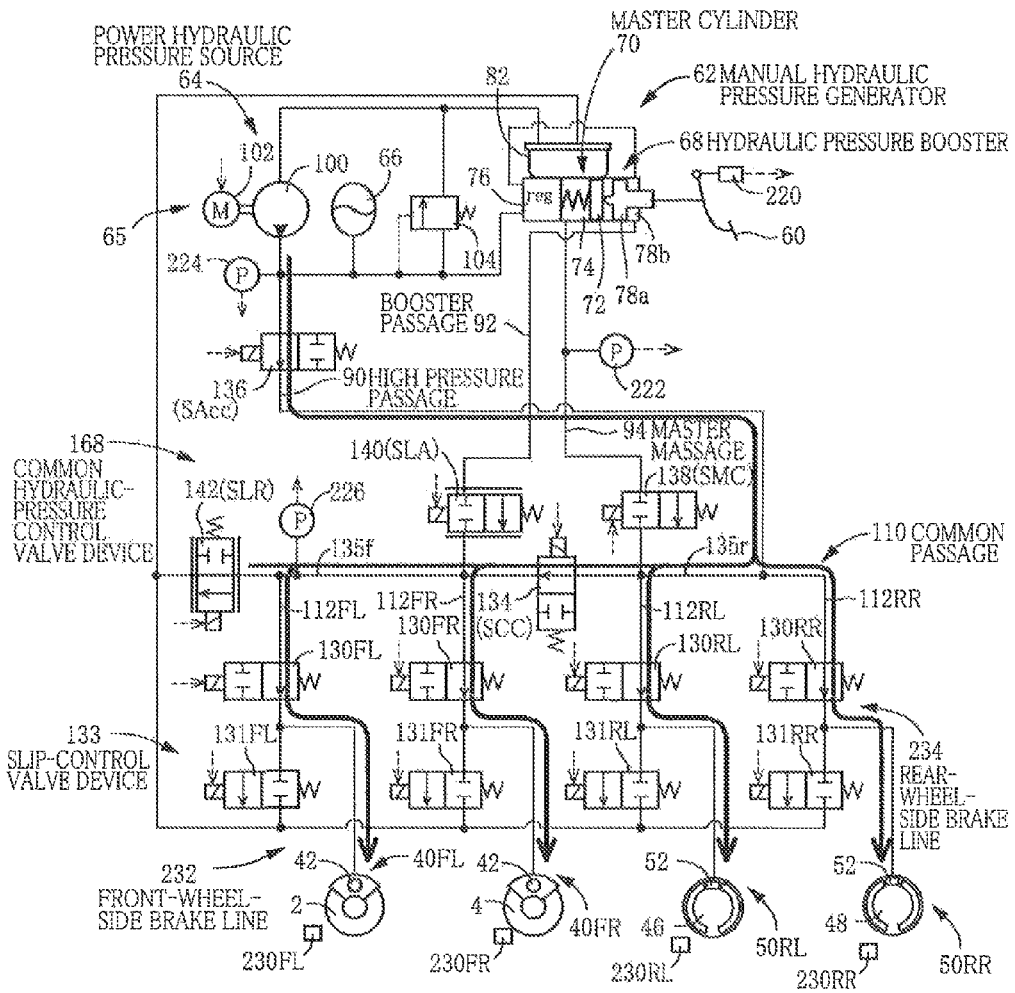
FIG. 13 is a view showing supply of the working fluid in a case when mode B is selected by execution of the above-described hydraulic-pressure supply control program.

As shown in FIGS. 6 and 13, the master cutoff valve 138, the accumulator cutoff valve 136 and the separate valve 134 are placed in their closed state (Shut), open state (Open) and open state (Open), respectively, and the hydraulic pressure of the common passage 110 is controlled to be reduced by controlling at least one of the first common hydraulic-pressure control valve 140 and the second common hydraulic-pressure control valve 142. Further, all of the pressure holding valves 130 are placed in their open states, while all of the pressure reducing valves 131 are placed in their closed states.

Thus, since the separate valve 134 is placed in its open state, the hydraulic pressures of the brake cylinders 42FL, 42FR, 52RL, 52RR provided for the four wheels 2, 4, 46, 48 are commonly controlled by utilizing the hydraulic pressure of the accumulator 66.

c-1) Setting of Brake-Assist-Control Execution Flag

Figure 9A:
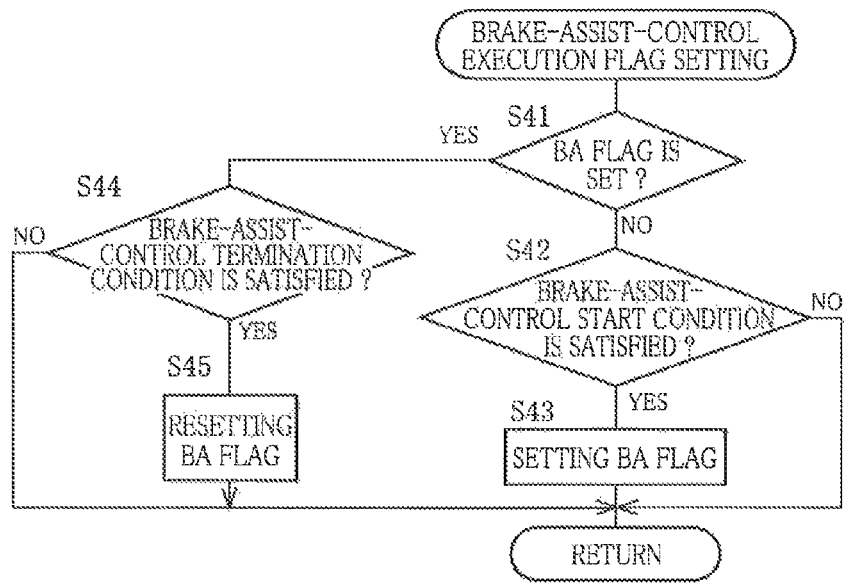
FIG. 9A is flow chart representing an assist-control-flag set program stored in the above-described memory portion.

In accordance with a brake-assist-control execution flag setting program represented by flow chart of FIG. 9A, the brake-assist-control execution flag is set upon satisfaction of a brake-assist-control start condition, and is reset upon satisfaction of a brake-assist-control termination condition. The brake-assist-control execution flag setting program is executed at a predetermined time interval.

The brake-assist-control execution flag setting program is initiated with S41 that is implemented to judge whether the brake-assist-control execution flag (BA flag) is set or not. When the flag is not set, S42 is implemented to judge whether the brake-assist-control start condition is satisfied or not. When at least one of a plurality of requirements is met, it is regarded that the brake assist is required (e.g., the brake pedal is depressed abruptly or depressed by a large force), and the brake-assist-control start condition is judged to be satisfied. As the above-described plurality of requirements, there are, for example, a requirement that a rate ds/st of increase of the operating stroke s that is a value detected by the stroke sensor 220, is higher than a given rate (ds/dt>dsth); a requirement that the operating stroke s is larger than a given stroke (s>sth); a requirement that the manual hydraulic pressure Pm that is a value detected by the manual hydraulic-pressure sensor 222, is higher than a given pressure (Pm>Pmth); and a requirement that a rate dPm/dt of increase of the manual hydraulic pressure Pm is higher than a given rate (dPm/dt>dPmth).

As long as the start condition is not satisfied, the BA flag remains reset. When the start condition is satisfied, S43 is implemented to set the BA flag.

When the BA flag is set, S44 is implemented to judge whether the brake-assist-control termination condition is satisfied or not. When at least one of a plurality of requirements is met, it is judged that the brake assist control is not required and that the brake-assist-control termination condition is satisfied. As the plurality of requirements, there are, for example, a requirement that the brake switch 218 has been turned OFF; a requirement that the vehicle has been stopped; and a requirement that the operating force (i.e., manual hydraulic pressure) has become smaller than a termination judgment threshold value. As long as the brake-assist-control termination condition is not satisfied, the BA flag remains set. When the termination condition is satisfied, S45 is implemented to reset the BA flag.

When the BA flag is set, a positive judgment (YES) is obtained in S4, and S6 is implemented to select the mode B.

c-3) Brake Assist Control

Figure 9B:
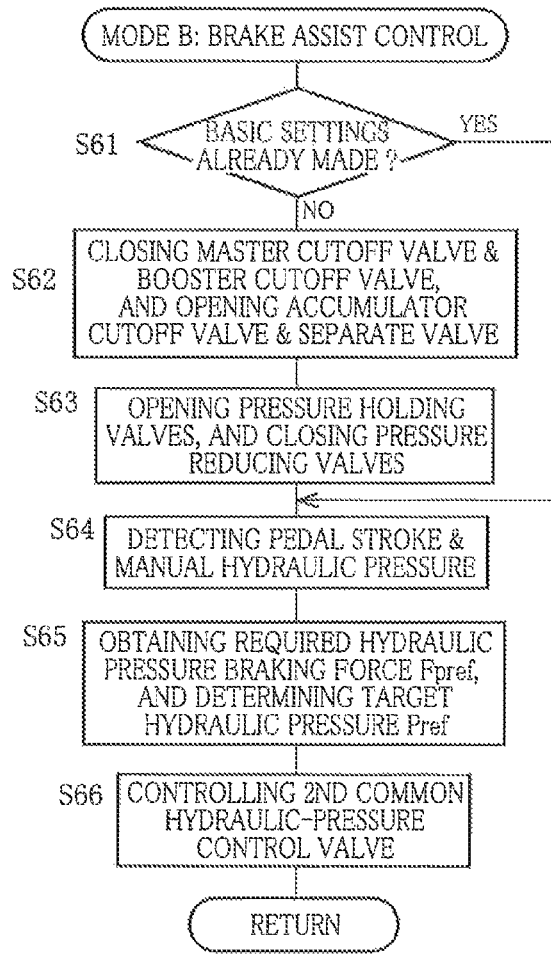
FIG. 9B is flow chart representing a brake assist control program stored in the above-described memory portion.

The brake assist control is executed by executing a brake assist control program that is represented by flow chart of FIG. 9B. The brake assist control program is executed at a predetermined time interval in a case when the mode B is selected.

The brake assist control program is initiated by S61 that is implemented to judge whether basic settings required for the mode B have been made or not. When the basic settings required for the mode B have not yet been set, S62 and S63 are implemented. In S62, the master cutoff valve 138 is placed in its closed state, the booster cutoff valve (first common hydraulic-pressure control valve) 140 is placed in its closed state, the accumulator cutoff valve 136 is placed in its open state, and the separate valve 134 is placed in its open state. In S63, all of the pressure holding valves 130 are placed in their open states while all of the pressure reducing valves 131 are placed in their closed states.

Under these states (being established by the basis settings), the hydraulic pressure of the common passage 110 is controlled by the second common hydraulic-pressure control valve 142 such that the hydraulic pressure of the common passage 110 becomes close to the target hydraulic pressure.

In S64, the operating stroke of the brake pedal 60 and the manual hydraulic pressure are detected. In S65, the required total braking force Fsref required by the vehicle operator is obtained based on values detected in S64, and the target hydraulic pressure Pref is obtained. In the brake assist control, the target hydraulic pressure Pref is determined to be higher than a hydraulic pressure corresponding to the required total braking force Fsref. Then, in S66, the second common hydraulic-pressure control valve 142 is controlled such that the value detected by the common hydraulic-pressure sensor 226 becomes close to the target hydraulic pressure Pref.

In the brake assist control program, the booster cutoff valve 140 is placed in its closed state in S62 and the second common hydraulic-pressure control valve 142 is controlled in S66. However, this arrangement may be modified such that the second common hydraulic-pressure control valve 142 is placed in its closed state in S62 and the first common hydraulic-pressure control valve 140 is controlled in S66.

When the brake assist control is executed, the hydraulic pressure of the common passage 110 is made higher than the hydraulic pressure of the hydraulic pressure booster 68, so that the first common hydraulic-pressure control valve 140 can be used as a pressure-reduction control valve for reducing the hydraulic pressure of the common passage 110. Further, also in the modified arrangement in which the first common hydraulic-pressure control valve 140 is used as the pressure-reduction control valve, the working fluid is returned to the booster chamber 78b rather than being returned to the pressurizing chamber 74. Thus, it is considered that the operation feeling given to the vehicle operator is hardly reduced due to return of the working fluid to the booster chamber 78b.

Further, in the mode B, the brake assist control may be executed in parallel with execution of the regenerative cooperative control.

d) Mode C

The mode C is selected in a case of execution of the antilock control.

Figure 14:
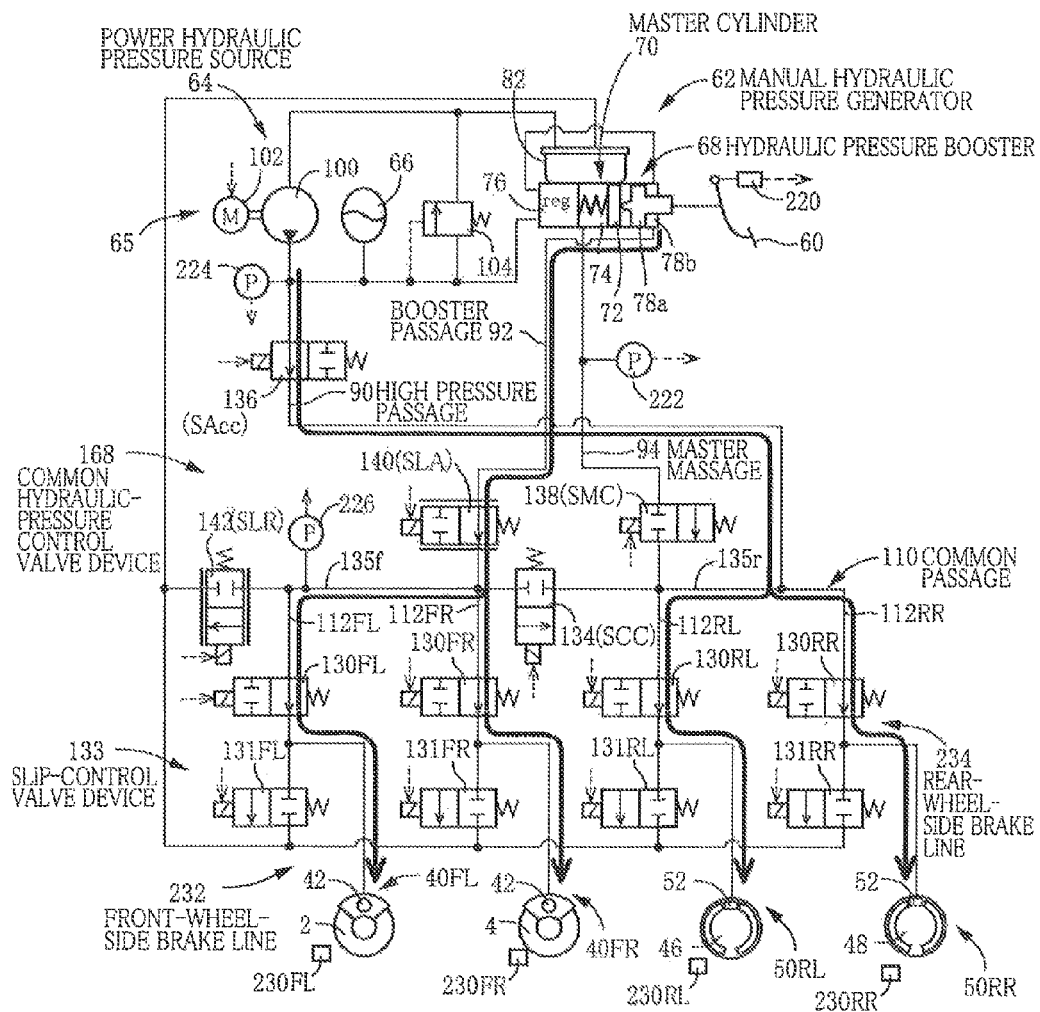
FIG. 14 is a view showing supply of the working fluid in a case when mode C is selected by execution of the above-described hydraulic-pressure supply control program.

As shown in FIGS. 6 and 14, the master cutoff valve 138 is placed in its closed state (Shut), the accumulator cutoff valve 136 is placed in its open state (Open), the separate valve 134 is placed in its closed state (Shut), the booster cutoff valve (first common hydraulic-pressure control valve) 140 is placed in its open state (Open), and the second common hydraulic-pressure control valve 142 is placed in its closed state (Shut). With each of these valves being thus placed in its open or closed state, the hydraulic pressures of the brake cylinders provided for the wheels, which are subjected to the control, are controlled independently of each other, by controlling the slip-control valve device 133 including the pressure holding valves 130FL, 130FR, 130RL, 130RR and the pressure reducing valves 131FL, 131FR, 131RL, 131RR. In the present embodiment, the electric current is supplied neither to the solenoid 155 of the first common hydraulic-pressure control valve 140 nor to the solenoid 165 of the second common hydraulic-pressure control valve 142 (namely, the supplied electric current is zero), without increase and reduction of the supplied electric current.

d-1) Setting of Antilock-Control Execution Flag

Figure 10A:
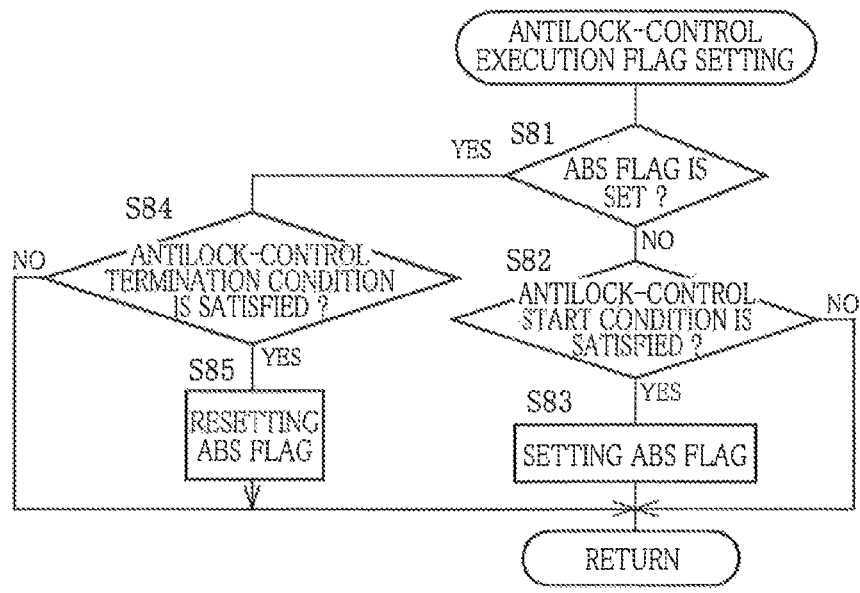
FIG. 10A is flow chart representing an antilock-control-flag set program stored in the above-described memory portion.

By execution of an antilock-control execution flag setting program that is represented by flow chart of FIG. 10A, the antilock-control execution flag (ABS flag) is set upon satisfaction of an antilock-control start condition, and is reset upon completion of an end processing.

When the ABS flag is reset, a negative judgment (NO) is obtained in S81, and S82 is implemented to judge whether the antilock-control start condition is satisfied or not. A wheel deceleration and a braking slip ratio of each of the four wheels 2, 4, 46, 48 are obtained based on a value detected by the wheel velocity sensor 230. It is regarded that the antilock-control start condition is satisfied, for example, in a case when the wheel deceleration of at least one of the four wheels is high and the braking slip ratio of the same at least one of the four wheels is excessively high. Upon satisfaction of the antilock-control start condition, S83 is implemented to set the ABS flag.

When the ABS flag is set, S84 is implemented to judge whether the below-described end processing has been completed or not. In the antilock control, the judgment as to whether the end processing has been completed or not is made, because the end processing is carried out after the antilock control is terminated. When the end processing is completed, S85 is implemented to reset the ABS flag. In the present embodiment, it is considered that the end processing is also included in the antilock control.

When the ABS flag is set, a positive judgment (YES) is obtained in S3, and S7 is implemented to select the mode C.

d-2) Antilock Control

Figure 10B:
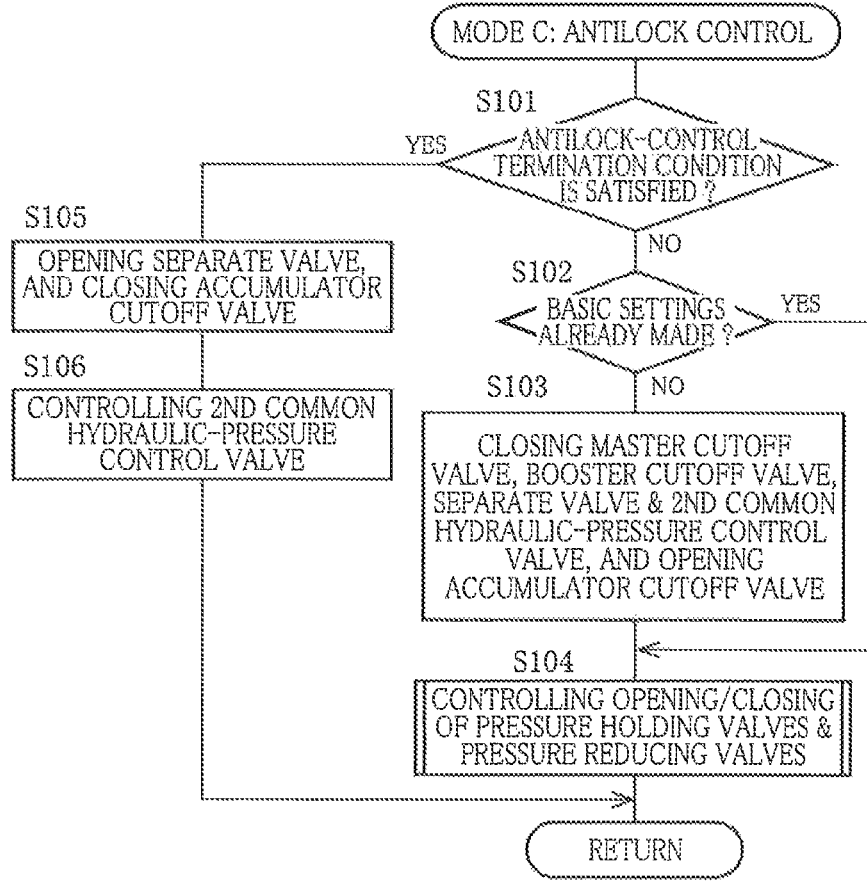
FIG. 10B is flow chart representing an antilock control program stored in the above-described memory portion.

When the mode C is selected, an antilock control program represented by flow chart of FIG. 10B is executed. In a case of execution of the antilock control program, the ABS flag is set so that it is judged in S101 whether an antilock-control termination condition is satisfied or not. It can be judged that the antilock-control termination condition is satisfied when at least one of a plurality of requirements is met. As the plurality of requirements, for example, there are a requirement that the brake switch 218 has been turned OFF and a requirement that the vehicle has been stopped.

When the antilock-control termination condition is not satisfied, S102 is implemented to judge whether basic settings required for the mode C have been made or not. When the basic settings required for the mode C have not yet been set, S103 and S104 are implemented. In S103, the master cutoff valve 138 is placed in its closed state, the accumulator cutoff valve 136 is placed in its open state, the booster cutoff valve (first common hydraulic-pressure control valve) 140 is placed in its open state, the separate valve 134 is placed in its closed state, and the second common hydraulic-pressure control valve 142 is placed in its closed state. Then, under these states being established by the basis settings, in S104, by opening and closing the pressure holding valves 130 and the pressure reducing valves 131 that are provided for the wheels that are subjected to the control, the hydraulic pressures of the brake cylinders provided for the wheels subjected to the control are increased and reduced independently of one another, such that the braking slip ratio is held within a suitable range that is determined depending on a friction coefficient of a road surface. For example, the hydraulic pressures of the brake cylinders 42FL, 42FR provided for the front left and right wheels 2, 4 are controlled independently of each other. However, the hydraulic pressures of the brake cylinders 52FL, 52FR provided for the rear left and right wheels 46, 48 may be controlled concurrently with each other. It is considered that, since the accumulator pressure is supplied to the rear-wheel-side passage portion 135r of the common passage 110, the pressure holding valve 130 is not held in its open state even if the corresponding wheel is not subjected to the control.

On the other hand, when the antilock-control termination condition is satisfied, the end processing is carried out in S105 and S106. In S105, the separate valve 134 is placed in its open state, and the accumulator cutoff valve 136 is placed in its closed state. In S106, the hydraulic pressure of the common passage 110 is controlled by the second common hydraulic-pressure control valve 142 so as to be reduced. By the pressure reduction control, the value detected by the common hydraulic-pressure sensor 226 is made close to the value detected by the manual hydraulic-pressure sensor 222 (namely, an absolute value of difference between the hydraulic pressure Pwc of the common passage and the manual hydraulic pressure Pm is made smaller than a given value). When the absolute value becomes not larger than the given value, it is judged that the end processing is completed so that a positive judgment (YES) is obtained in S84 whereby the ABS flag is reset in S85.

d-3) Effects (i) Fluid Shortage Restraining Effect

In the hydraulic brake system of the present embodiment, the working fluid is returned to the reservoir 82 when the hydraulic pressures of the brake cylinders 42, 52 are reduced in the antilock control. Therefore, when the antilock control is executed with the master cutoff valve 138 being placed in its open state (Open), namely, when the pressure increase control is executed after execution of the pressure reduction control, there would be shortage of the hydraulic pressure, thereby causing problems such as excessively deep introduction of the pressurizing piston 72 and unsatisfactory execution of the antilock control. Where a so-called circulating-type anti-lock device is employed in the hydraulic brake system, the shortage of the working fluid is hardly caused. However, where the working fluid is returned to the master reservoir 82, the shortage of the working fluid is easily caused.

On the other hand, in the present embodiment, the hydraulic pressures of the brake cylinders 52RL, 52RR provided for the rear left and right wheels 46, 48 are controlled by utilizing the accumulator pressure, while the hydraulic pressures of the brake cylinders 42FL, 42FR provided for the front left and right wheels 2, 4 are controlled by utilizing the hydraulic pressure of the hydraulic pressure booster 68. The hydraulic pressure booster 68 is connected to the power hydraulic pressure source 64, so that the working fluid is supplied from the power hydraulic pressure source 64 to the hydraulic pressure booster 68.

Thus, in the present embodiment, the antilock control is executed without utilizing the hydraulic pressure of the mater cylinder 70, so that the fluid shortage can be satisfactorily restrained and the excessively deep introduction of the brake pedal 60 can be restrained. Further, since the excessively deep introduction of the brake pedal 60 can be restrained, it is possible to reduce a necessity of increasing a rod stroke of the pressurizing piston 72.

Further, an insufficiency of the pressure increase in the antilock control can be restrained whereby the antilock control can be satisfactorily executed. It is therefore possible to establish a state in which the friction coefficient of the road surface can be maximally utilized, and to accordingly reduce the braking distance.

(ii) Effects for Operation Feeling (x) Since the master cutoff valve 138 is placed in its closed state, the brake pedal 60 is not influenced by supply of the hydraulic pressure of the accumulator 66 to the rear-wheel-side passage portion 135*r* of the common passage 110 and increase/reduction of the hydraulic pressure of each of the brake cylinders 52RL, 52RR provided for the rear wheels 46, 48.

Therefore, it is possible to restrain a kickback and other reduction of operation feeling given to the vehicle operator who operates the brake pedal 60.

(y) Further, since the hydraulic pressure of the accumulator 60 is considerably high, the hydraulic pressure of the rear-wheel-side passage portion 135*r* of the common passage 110 is higher than the hydraulic pressure on an upstream side of the master cutoff valve 138 when the antilock control is terminated. If the accumulator cutoff valve 136 and the master cutoff valve 138 are placed back into the closed state and the open state, respectively, immediately after the antilock control has been terminated, an uncomfortable feeling would be given to the vehicle operator due to, for example, occurrence of the kickback. Further, even if the brake pedal 60 is released, the deceleration of the vehicle would not be immediately reduced whereby a brake feeling would be reduced.

On the other hand, in the present embodiment, when the antilock-control termination condition is satisfied, the end processing is carried out whereby the hydraulic pressure of the common passage 110 (i.e., the value detected by the common hydraulic-pressure sensor 226) is made close to the hydraulic pressure on the upstream side of the master cutoff valve 138 (i.e., the value detected by the manual hydraulic-pressure sensor 222). After the end processing has been completed, the master cutoff valve 138 is placed in its open state. Consequently, it is possible to restrain the kickback and accordingly to restrain reduction of the brake feeling given to the vehicle operator.

(z) Meanwhile, it might be considered possible to control the hydraulic pressures of the brake cylinders 42, 52 provided for the four wheels, by utilizing the hydraulic pressure of the accumulator 66. That is, the hydraulic pressures of the brake cylinders 42, 52 could be controlled, for example, by placing the master cutoff valve 138 and the first common hydraulic-pressure control valve (booster cutoff valve) 140 into their closed states and placing the separate valve 134 and the accumulator cutoff valve 136 into their open states.

However, in comparison with the case where the hydraulic pressures of the four brake cylinders 42, 52 are controlled by utilizing the hydraulic pressure of the accumulator 66 and the case where the mode C is set as in the present embodiment, an uncomfortable feeling, which is given to the vehicle operator when the master cutoff valve 138 is switched from its closed state to its open state upon termination of the antilock control, is smaller in the case where the mode C is set than the case where hydraulic pressures of the four brake cylinders 42, 52 are controlled by utilizing the hydraulic pressure of the accumulator 66. This is because the uncomfortable feeling given to the vehicle operator in the case where the mode C is set, is only due to influence by change of the pressurizing chamber 74.

d-4) Other Arrangements (i) In the present embodiment, when the antilock-control execution flag is being set, it is judged that the antilock control is being executed, and the mode C is selected.

However, the execution of the antilock control can be detected based on the value detected by the common hydraulic-pressure sensor 226 and the value detected by the stroke sensor 220. It is possible to judge that the antilock control is being executed when at least one of a plurality of requirements is met. As the plurality of requirements, there are, for example, (a) a requirement that the common hydraulic pressure is small relative to the operating stroke and (b) a requirement that a frequency of change of the common hydraulic pressure is higher than a given frequency.

(ii) Further, the hydraulic pressures of the brake cylinders 42, 52 provided for the four wheels 2, 4, 46, 48 may be controlled with utilization of the accumulator pressure, by placing the booster cutoff valve 140 and the master cutoff valve 138 in their closed states and placing the separate valve 134 and the accumulator cutoff valve 136 in their open states. In this case, during execution of the antilock control, the hydraulic pressure of the common passage 110 can be controlled by the second common hydraulic-pressure control valve 142 such that the hydraulic pressure of the common passage 110 becomes equal in magnitude to the manual hydraulic pressure. According to this arrangement, it is possible to reduce necessity of execution of the end processing, and to alleviate an uncomfortable feeling given to the vehicle operator when the master cutoff valve 138 and the booster cutoff valve 140 are switched to their open states.

(iii) Further, the hydraulic pressures of the brake cylinders 42, 52 provided for the four wheels 2, 4, 46, 48 may be controlled with utilization of the hydraulic pressure of the booster chamber 78*b*. The shortage of the hydraulic pressure of the booster chamber 78*b* is hardly caused, because the hydraulic pressure is supplied to the booster chamber 78*b* from the power hydraulic pressure source 64. Further, the utilization of the hydraulic pressure of the booster chamber 78*b* eliminates necessity the execution of the end processing. It is noted that it may be judged that the antilock-control termination condition is satisfied when the pressure-increase mode is established for the four wheels 2, 4, 46, 48.

e) Mode D

The mode D is selected in a case of execution of the traction control or the vehicle stability control (in a state in which the hydraulic brakes 40, 50 are not activated). As shown in FIG. 6, in mode D, the master cutoff valve 138, the accumulator cutoff valve 136 and the separate valve 134 are placed in the closed state (Shut), the open state (Open) and the open state (Open), respectively. Further, the first and second common hydraulic-pressure control valves 140 142 are placed in their closed states (Shut). With these valves being thus placed in the open or closed states, the brake cylinder or cylinders provided for the wheel or wheels subjected to the control is controlled by controlling the slip-control valve device 133.

Figure 15:
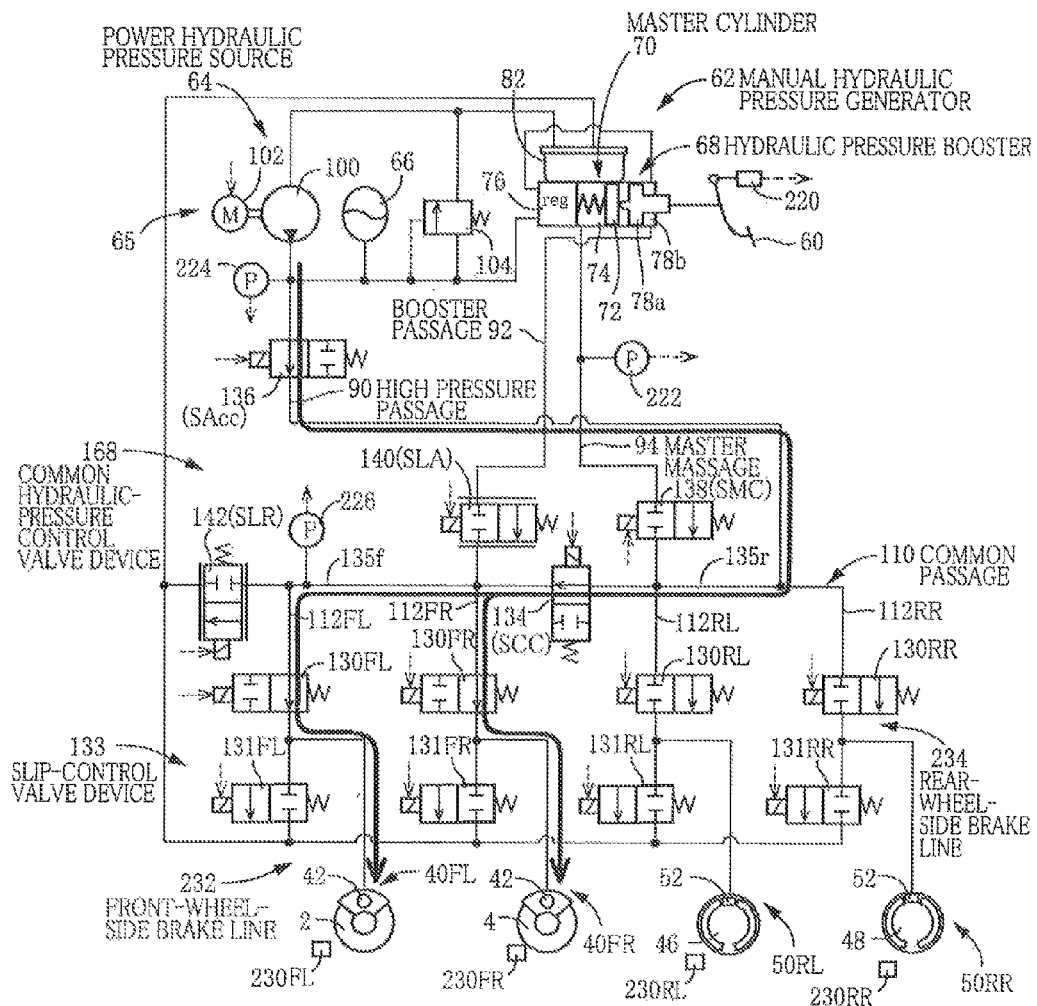
FIG. 15 is a view showing supply of the working fluid in a case when mode D is selected by execution of the above-described hydraulic-pressure supply control program.

In the traction control, the hydraulic pressures of the brake cylinders 42FL, 42FR provided for the front left and right wheels 2, 4 as drive wheels are controlled by opening and closing the pressure holding valves 130FL, 130FR and the pressure reducing valves 131FL, 131FR, such that the drive slip state is held in a suitable range that is determined depending on the friction coefficient of the road surface. Since the hydraulic pressure is not supplied to the brake cylinders 52RL, 52RR provided for the rear left and right wheels 46, 48, the pressure holding valves 130RL, 130RR are held in their closed states (see FIG. 15).

In the vehicle stability control, the wheel or wheels to be subjected to the control is determined, and the hydraulic pressure or pressures of the brake cylinder or cylinders provided for the wheel or wheels to be controlled is controlled such that a drift-out state and a spin state are restrained. The determination of the wheel or wheels to be controlled is made based on, for example, the drift-out state and the spin state.

Upon termination of the traction control or the vehicle stability control, the hydraulic pressure of the common passage 110 and the hydraulic pressures of the brake cylinders 42, 52 are returned to the atmospheric pressure, by controlling the second common hydraulic-pressure control valve 142.

Hereinafter, the traction control will be described.

e-1) Setting of Traction Control Execution Flag

Figure 11A:
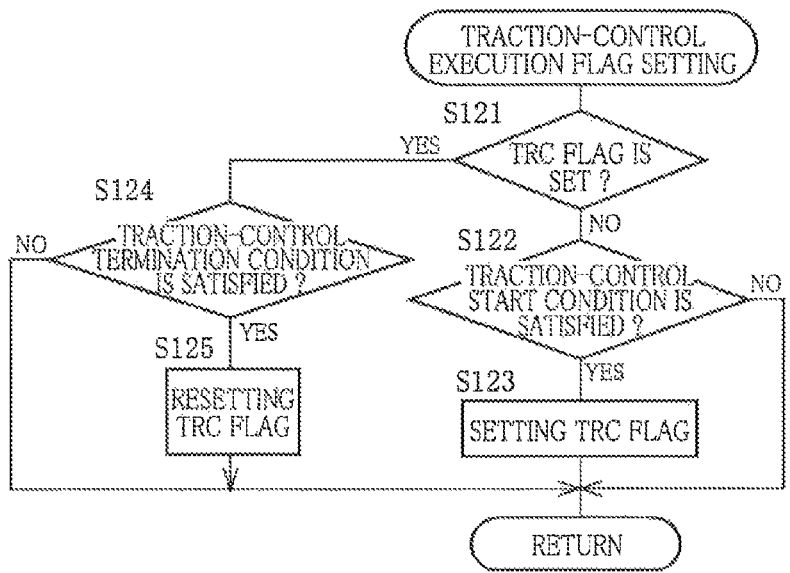
FIG. 11A is flow chart representing a traction-control-flag set program stored in the above-described memory portion.

In accordance with a traction-control execution flag setting program represented by flow chart of FIG. 11A, the traction-control execution flag (TSC flag) is set upon satisfaction of a traction-control start condition, and is reset upon completion of the end processing.

For example, when the rotational velocity of the drive wheels 2, 4 is not lower than a given velocity, it is judged that the traction-control start condition is satisfied whereby a positive judgment (YES) is obtained in S122. Then, the traction-control execution flag is set in S123.

Further, when the end processing is completed with the traction-control execution flag being set, a positive judgment (YES) is obtained in S214. Then, the traction-control execution flag is reset in S125.

When the traction-control execution flag is set, a positive judgment (YES) is obtained in S8. Then, the mode D is selected in S9.

e-2) Traction Control

Figure 11B:
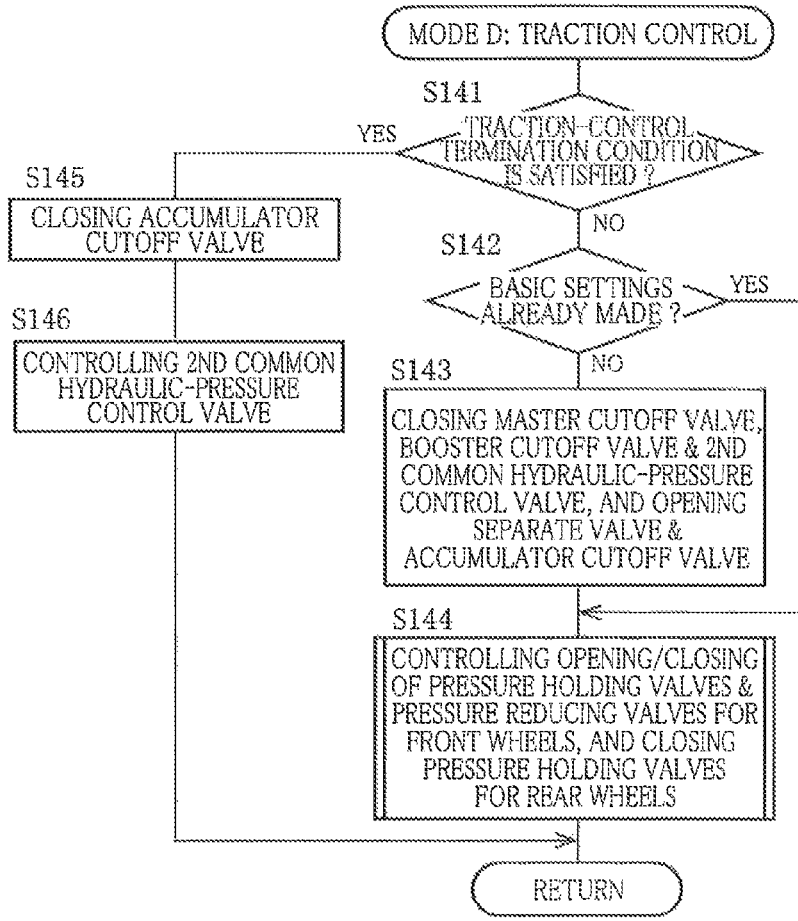
FIG. 11B is flow chart representing a traction control program stored in the above-described memory portion.

FIG. 11B shows a flow chart representing a traction control program that is executed at a predetermined time interval in a case when the mode D is selected.

The execution of this traction control program is initiated with S141 that is implemented to judge whether the traction-control termination condition is satisfied or not. It is judged that the traction-control termination condition is satisfied when at least one of a plurality of requirement is met. As the plurality of requirements, there are, for example, a requirement that a drive slip becomes small and a requirement that an acceleration pedal (not shown) is released.

As long as the traction-control termination condition is not satisfied, when the basic settings required for the mode D have not yet been set, S143 is implemented to carry out the basic settings for the mode D. Specifically, in S143, the master cutoff valve 138 and the booster cutoff valve 140 are placed in their closed states, the accumulator cutoff valve 136 and the separate valve 134 are placed in their open states, and the second common hydraulic-pressure control valve 142 is placed in its closed state. Then, in S144, the pressure holding valves 130FL, 130FR and the pressure reducing valves 131FL, 131FR provided for the drive wheels 2, 4 are controlled to be opened and closed. Meanwhile, the pressure holding valves 130RL, 130RR provided for the non-drive wheels 46, 48 are held in their closed states.

When the traction-control termination condition is satisfied, the end processing is carried out in S145 and S146. The accumulator cutoff valve 136 is placed in its closed state. The second common hydraulic-pressure control valve 142 is controlled such that the hydraulic pressure of the common passage 110 is returned to the atmospheric pressure. When the hydraulic pressure of the common passage 110 becomes not higher than a given pressure, it is judged that the end processing is completed.

f) Mode E

In the event of failure of the system, for example, when the valves such as the first and second common hydraulic-pressure control valves 140, 142 are uncontrollable due to failure of an electric system, the electric current is not supplied to the electromagnetic control valves so that the valves are placed in their original positions as shown in FIG. 2.

As shown in FIG. 6, the master cutoff valve 138 is placed in its open state (Open), the accumulator cutoff valve 136 is placed in its closed state (Shut), and the separate valve 134 is placed in its closed state (Shut). Further, the first common hydraulic-pressure control valve 140 is placed in its open state (Open) while the second common hydraulic-pressure control valve 142 is placed in its closed state (Shut). Thus, the pressurizing chamber 74 of the master cylinder 70 and the booster chamber 78b of the hydraulic pressure booster 68 are in communication with the common passage 110.

With the brake pedal 60 being depressed, the hydraulic pressure whose magnitude corresponds to the operating force applied to the brake pedal 60 is generated in each of the pressurizing chamber 74 and the regulator chamber 80b. The spool 80a is moved forwardly as a result of forward movement of the pressurizing piston 72 whereby the regulator chamber 80b is isolated from the reservoir 82, so that the hydraulic pressure whose magnitude corresponds to the operating force is generated in the regulator chamber 80b.

The hydraulic pressure of the pressurizing chamber 74 is supplied to the brake cylinders 52 provided for the rear left and right wheels 46, 48, while the hydraulic pressure of the booster chamber 78b is supplied to the brake cylinders 42 provided for the front left and right wheels 2, 4. Since the two brake lines 232, 234 are made independent from each other, it is possible to generate the hydraulic pressures in the respective two brake lines 232, 234 independently from each other.

As described above, in the present embodiment, the booster chamber 78b of the hydraulic pressure booster 68 corresponds to a first hydraulic pressure source, the booster cutoff valve (i.e., first common hydraulic-pressure control valve) 140 corresponds to a first hydraulic pressure control valve, the pressurizing chamber 74 of the master cylinder 70 corresponds to a second hydraulic pressure source, and the master cutoff valve 138 corresponds to a second-hydraulic-pressure-source cutoff valve. The first hydraulic pressure source corresponds also to a first manual hydraulic pressure source. The second hydraulic pressure source corresponds also to a second manual hydraulic pressure source.

A first hydraulic pressure controlling portion is constituted by, for example, the first common hydraulic-pressure control valve 140 and portions of the brake ECU 56 which are assigned to store and implement S24-S28. A first hydraulic pressure generator is constituted by, for example, the booster chamber 78b and the first hydraulic pressure controlling portion. The first hydraulic pressure generator may be referred also to as a controlled-hydraulic-pressure generator.

Further, the first hydraulic pressure controlling portion corresponds to a regenerative-cooperative controlling portion. A regenerative-cooperative-control-execution-time target hydraulic pressure determining portion is constituted by, for example, portions of the brake ECU 56 which are assigned to store and implement S27.

Further, a slip controlling portion is constituted by portions of the brake ECU 56 which are assigned to store and implement S104 and S144.

Moreover, a hydraulic-pressure supply controller is constituted by, for example, portions of the brake ECU 56 which are assigned to store and execute the hydraulic-pressure supply control program (S1-S10). A regenerative-cooperative-control hydraulic-pressure supply controlling portion is constituted by, for example, portions of the brake ECU 56 which are assigned to store and implement S5 (S22 and S23). A brake-assist-control-execution-time hydraulic-pressure supply controlling portion is constituted by, for example, portions of the brake ECU 56 which are assigned to store and implement S6 (S62 and S63). An antilock-control-execution-time hydraulic-pressure supply controlling portion is constituted by, for example, portions of the brake ECU 56 which are assigned to store and implement S7 (S103).

Embodiment 2

Figure 18:
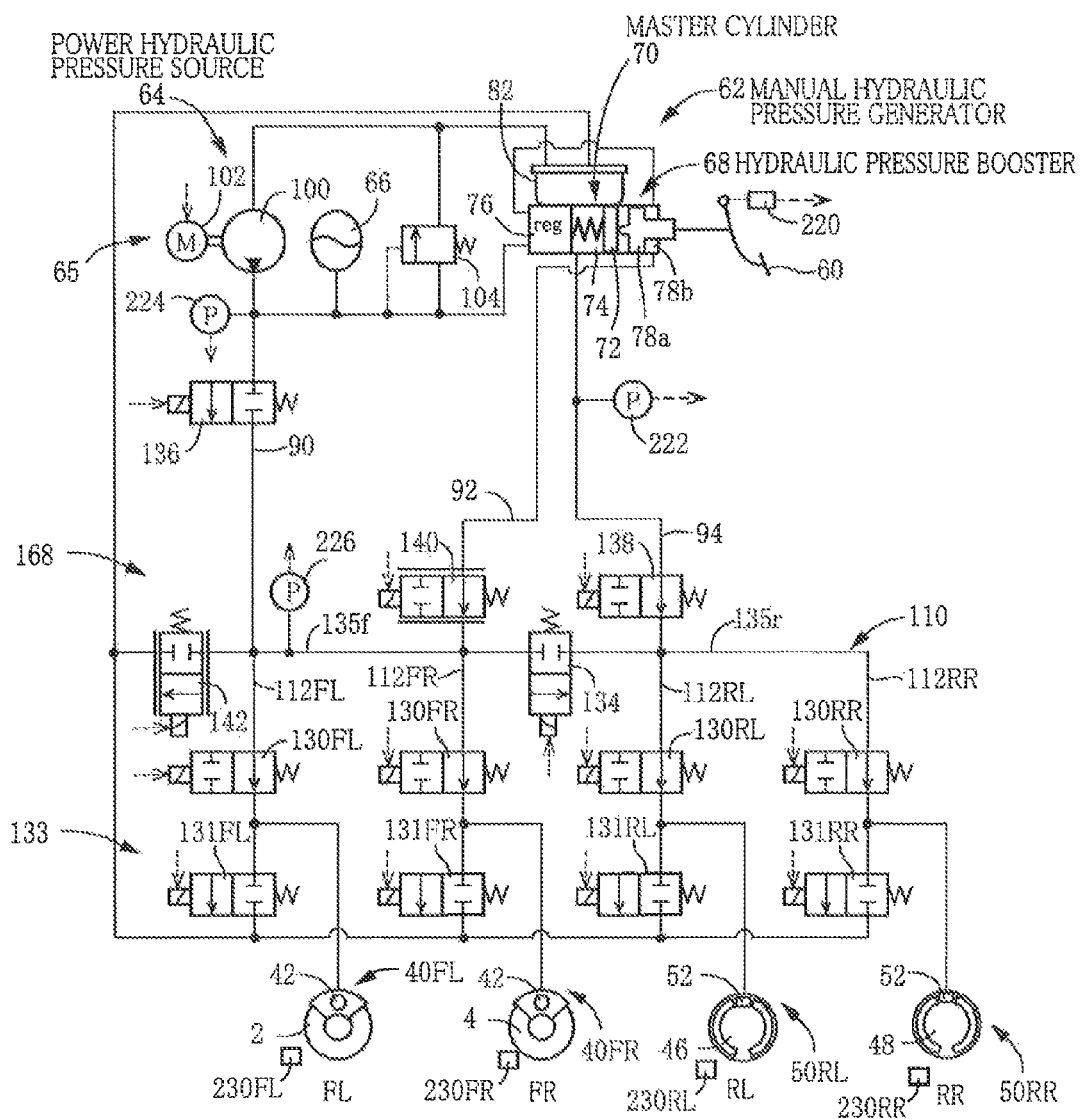
FIG. 18 is a circuit diagram showing a brake hydraulic pressure circuit of a hydraulic brake system according to another embodiment of the present invention.

The brake circuit may be constituted also by a circuit shown in FIG. 18.
<Construction>
In the present embodiment, the high pressure passage 90 is connected to the front-wheel-side passage portion 135*f* of the common passage 110. Since the other parts of the hydraulic brake system according to Embodiment 2 are the same as those of the hydraulic brake system according to Embodiment 1, the description thereof will not be provided.
<Control>
(i) In the antilock control, the separate valve 134 is placed in its open state, the master cutoff valve 138 and the booster cutoff valve (first common hydraulic-pressure control valve) 140 are both placed in their closed states, and the accumulator cutoff valve 136 is placed in its open state, so that the hydraulic pressures for the four wheels 2, 4, 46, 48 are controllable with utilization of the accumulator pressure.

It is noted that, in the antilock control, the hydraulic pressure of the common passage 110 can be controlled, by the second common hydraulic-pressure control valve 142, so as to become close to a hydraulic pressure corresponding to the manual hydraulic pressure. Where such a control is executed during execution of the antilock control, it is possible to reduce necessity of execution of the end processing.

(ii) In the traction control, the separate valve 134 is placed in its closed state, and the accumulator cutoff valve 136 is placed in its open state, so that the hydraulic pressures of the brake cylinders 42FL, 42FR provided for the drive wheels 2, 4 are controllable by the pressure holding valves 130FL, 130FR and the pressure reducing valves 131FL, 131FR.

It is also possible to make the hydraulic pressures of the brake cylinders 42 provided for the left and right drive wheels 2, 4 controllable commonly, by controlling one of the first and second common hydraulic-pressure control valves 140, 142. In this case, it is also possible to reduce frequency of operation of each of the pressure holding valves 130FL, 130FR and the pressure reducing valves 131FL, 131FR.

Embodiment 3

Figure 19:
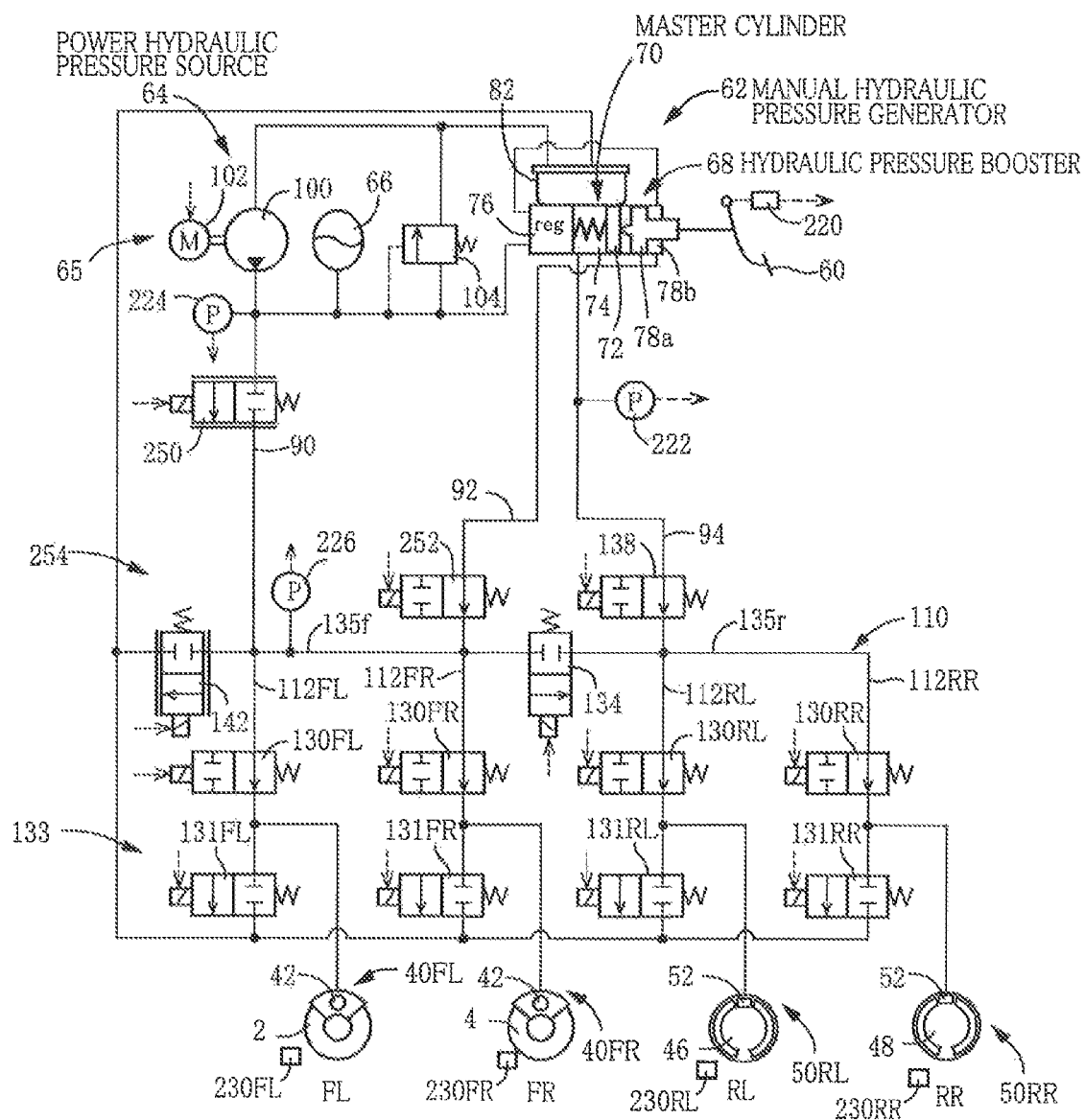
FIG. 19 is a circuit diagram showing a brake hydraulic pressure circuit of a hydraulic brake system according to still another embodiment of the present invention.
Figure 20:
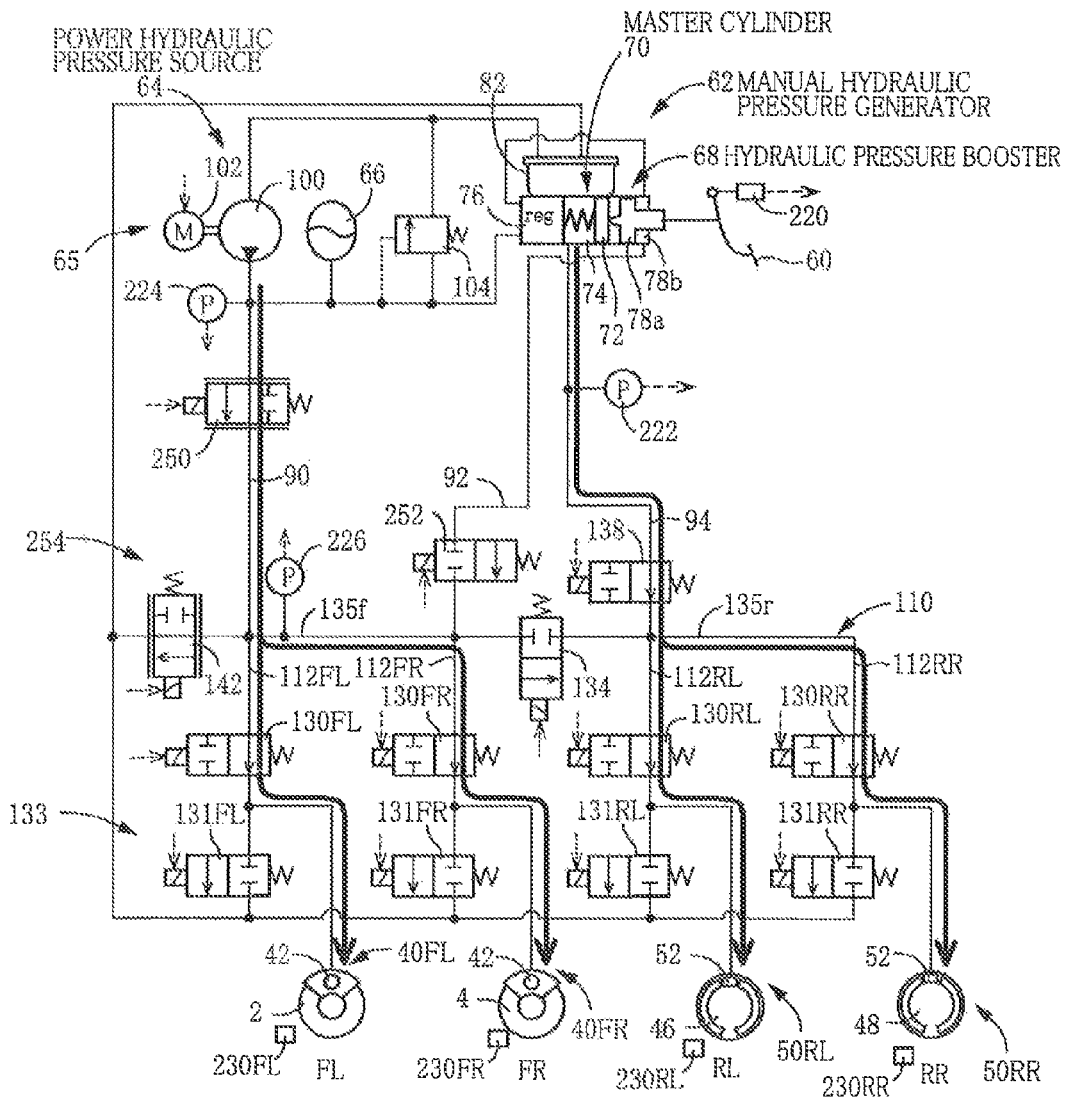
FIG. 20 is a view showing an operational state of the above-described hydraulic brake system (in the regenerative cooperative control).

The brake circuit may be constituted also by a circuit shown in FIG. 19.
<Construction>
The high pressure passage 90 is connected to the front-wheel-side passage portion 135*f* of the common passage 110. The accumulator cutoff valve is constituted by a normally-closed electromagnetic linear valve (pressure-increasing electromagnetic linear valve) 250. The first common hydraulic-pressure control valve is constituted by a normally-open electromagnetic on-off valve (booster cutoff valve) 252. Since the other parts of the hydraulic brake system according to Embodiment 3 are the same as those of the hydraulic brake system according to Embodiment 1, the description thereof will not be provided.
<Control>
(i) In a case when the regenerative cooperative control is executed, as shown in FIG. 20, the booster cutoff valve (electromagnetic on-off valve) 252 is placed in its closed state and the master cutoff valve 138 is placed in its open state, so that the hydraulic pressure of the front-wheel-side passage portion 135*f* of the common passage 110 (i.e., hydraulic pressures of the brake cylinders 42FL, 42FR) is controllable by controlling the pressure-increasing electromagnetic linear valve 250 and the second common hydraulic-pressure control valve 142. To the brake cylinders 52RL, 52R provided for the rear left and right wheels 46, 48, the hydraulic pressure of the master cylinder 70 is supplied, as in Embodiment 1.

Thus, in the present embodiment, during execution of the regenerative cooperative control, the accumulator pressure is controlled and supplied to the brake cylinders 42FL, 42FR.

(ii) Further, in the brake circuit of FIG. 19, the regenerative cooperative control does not necessarily have to be executed. For example, it is also possible to control the hydraulic pressures of the brake cylinders 42FL, 42FR so as to obtain a required deceleration that is determined depending on an operational state of the brake pedal 60 operated by the vehicle operator. In a case when the hydraulic pressure of each brake cylinder 42 and the hydraulic pressure of each brake cylinder 52 are equal to each other, the hydraulic pressure braking force applied to each of the front wheels 2, 4 is larger than the hydraulic pressure braking force applied to each of the rear wheels 46, 48. Therefore, it is possible to effectively increase a total hydraulic pressure braking force applied to the entirety of the vehicle, by increasing the hydraulic pressures of the brake cylinders 42FL, 42FR provided for the front wheels 2, 4.

Figure 21:
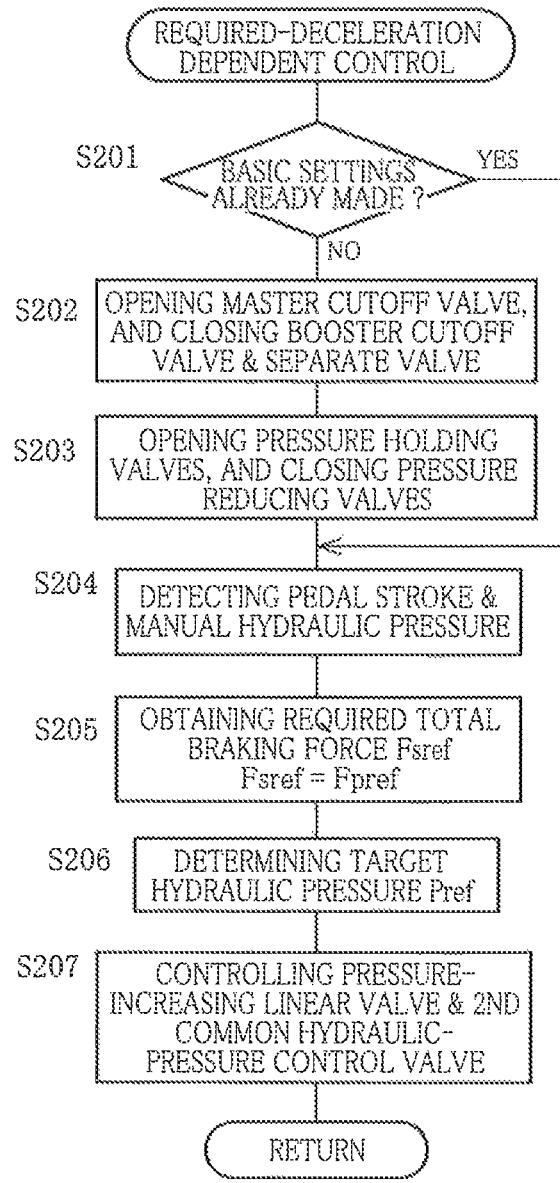
FIG. 21 is a flow chart representing a required-deceleration-dependent hydraulic-pressure control program stored in the memory portion of the brake ECU of the above-described hydraulic brake system.

FIG. 21 is a flow chart representing a required-deceleration-dependent hydraulic-pressure control program that is executed at a predetermined time interval.

In S201-S203, the basic settings are carried out. The master cutoff valve 138 is placed in its open state, the booster cutoff valve 252 is placed in its closed state, and the separate valve 134 is placed in its closed state. Further, all of the pressure holding valves 130 are placed in their open states while the all of the pressure reducing valves 131 are placed in their closed states. Then, in S204-S206, a magnitude of the target hydraulic pressure Pref is determined such that the required total braking force Fsref required by the vehicle operator can be established by the determined magnitude of the target hydraulic pressure Pref. Then, in S207, the hydraulic pressure of the front-wheel-side passage portion 135f of the common passage 110 is controlled, by the pressure-increasing electromagnetic linear valve 250 and the second common hydraulic-pressure control valve 142, so as to become close to the target hydraulic pressure Pref.

In the present embodiment, the power hydraulic pressure source 64 corresponds to the first hydraulic pressure source. A power hydraulic pressure controlling portion is constituted by, for example, the pressure-increasing electromagnetic linear valve 250 and portions of the brake ECU 56 which are assigned to store and implement S204-S207. A required-deceleration-dependent target hydraulic pressure determining portion is constituted by, for example, portions of the brake ECU 56 which are assigned to store and implement S206.

Other Embodiment

Figure 23:
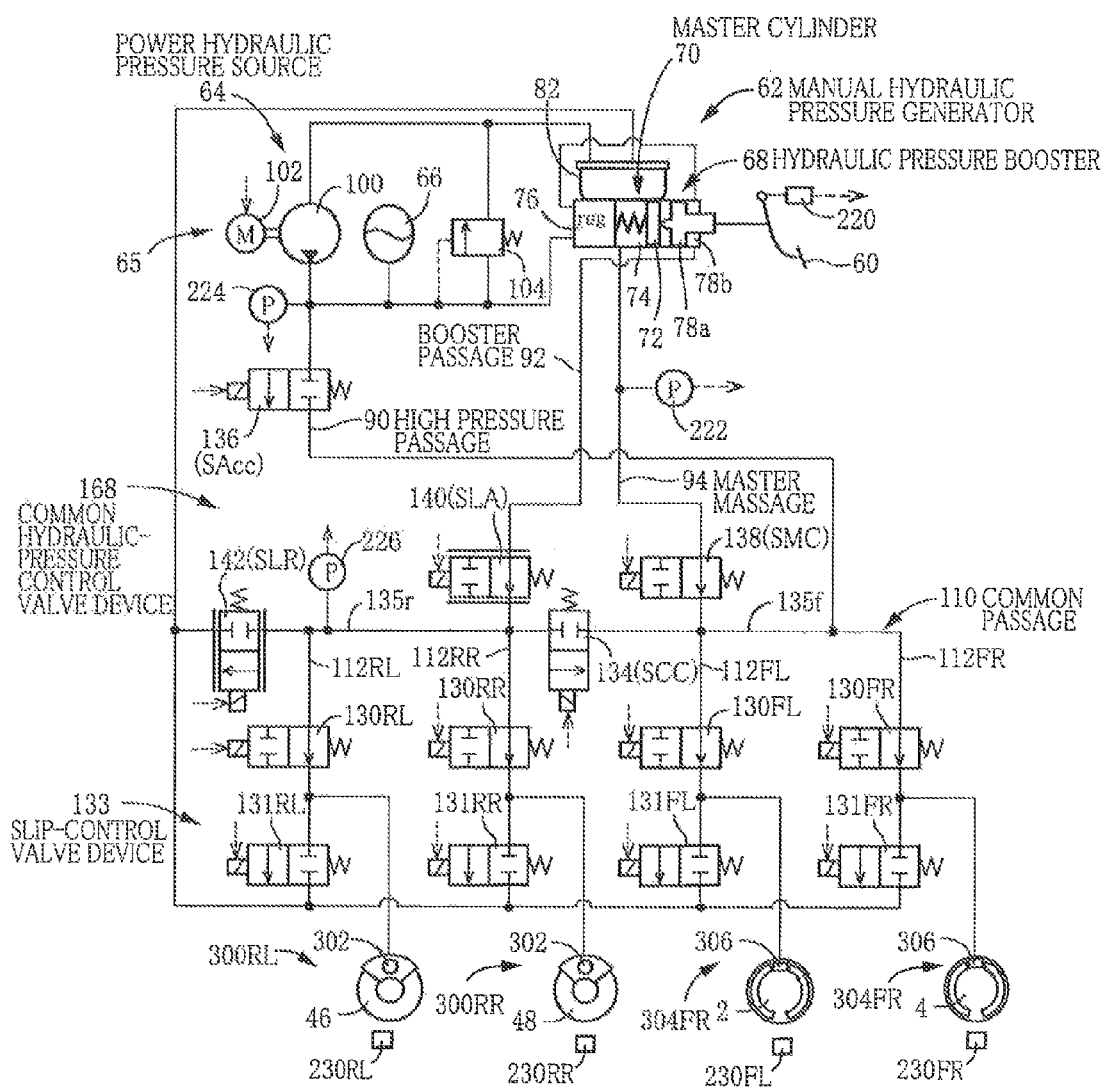
FIG. 23 is a circuit diagram showing a brake hydraulic pressure circuit of a hydraulic brake system according to still another embodiment of the present invention.

The present invention is applicable also to a vehicle in which rear wheels are drive wheels. An example of this case is shown in FIG. 23. In this embodiment, disk brakes 300 are provided for the rear wheels 46, 48 so that brake cylinders 302 provided for the rear wheels correspond to the first brake cylinders. Drum brakes 304 are provided for the front wheels 2, 4 so that brake cylinders 306 provided for the front wheels correspond to the second brake cylinders. In a case when the regenerative cooperative control is executed, the regenerative braking force is applied to each of the rear wheels 46, 48, and the hydraulic pressure of the booster chamber 78b is controlled and supplied to the first brake cylinders 302 provided for the rear wheels 46, 48 while the hydraulic pressure of the pressurizing chamber 74 of the master cylinder 70 is supplied to the second brake cylinders 306 provided for the front wheels 2, 4.

Further, the present invention is applicable also to a hydraulic brake system in which disk brakes or drum brakes are provided for all of the four wheels.

It is also possible to eliminate, from the hydraulic brake system, the stroke sensor 220 and/or the second common hydraulic-pressure control valve 142. In this case, the cost can be further reduced.

Further, the manual hydraulic pressure generator 62 may be a tandem-type master cylinder. In this case, two pressurizing chambers are connected to the common passage 110.

As described above, in the antilock control, there are (x) a case where the mode C is set (specifically described, the separate valve 134 is placed in its closed state, and the hydraulic pressures of the brake cylinders provided for the front wheels 2, 4 are controlled by utilizing the hydraulic pressure of the booster chamber 78b while the hydraulic pressures of the brake cylinders 52 provided for the rear wheels 46, 48 are controlled by utilizing the hydraulic pressure of the accumulator 66, (y) a case where the hydraulic pressures of the brake cylinders 42, 52 provided for the four wheels are controlled by utilizing the hydraulic pressure of the accumulator 66, and (z) a case where the hydraulic pressures of the brake cylinders 42, 52 provided for the four wheels are controlled by utilizing the hydraulic pressure of the booster chamber 78b. When the antilock control is started from a state of execution of the brake assist control (mode B), it is possible to switch from the state of execution of the brake assist control to a state of the above case (y), for example. When the antilock control is started from a state of execution of the regenerative cooperative control, it is possible to switch from the state of execution of the regenerative cooperative control to a state of the above case (x), for example. Moreover, when the hydraulic pressures of the brake cylinders are high upon start of the antilock control (namely, when the antilock control is executed on a road surface with a high friction coefficient), it is also possible to switch to a state of the above case (y). When the hydraulic pressures of the brake cylinders are low upon start of the antilock control (namely, when the antilock control is executed on a road surface with a low friction coefficient), it is also possible to switch to a state of the above case (z).

Further, although five modes consisting of modes A-E are selectable in the above-described embodiments, this is not essential as long as the mode A can be set at least when the regenerative cooperative control is executed.

Moreover, the present invention can be carried out in not only the above-described modes but also in other modes of various modifications and improvements that will be made based on knowledge of a person skilled in the art.

DESCRIPTION OF REFERENCE SIGNS 40, 300: disk brakes 52, 304: drum brakes 42, 52, 302, 306: brake cylinders 56: brake ECU 58: hybrid ECU 68: hydraulic pressure booster 70: master cylinder 72: pressurizing piston 74: pressurizing chamber 76: regulator 78a: power piston 78b: booster chamber 110: common passage 130: pressure holding valves 131: pressure reducing valves 133: slip-control valve device 134: separate valve 135f: front-wheel-side passage portion 135r: rear-wheel-side passage portion 136: accumulator cutoff valve 138: master cutoff valve 140: first common hydraulic-pressure control valve 142: second common hydraulic-pressure control valve 220: stroke sensor 222: manual hydraulic-pressure sensor 226: common hydraulic-pressure sensor 232: front-wheel-side brake line 234: rear-wheel-side brake line.

The invention claimed is:

1. A hydraulic brake system comprising:
a plurality of hydraulic brakes provided for respective wheels of a vehicle, and configured to be activated by hydraulic pressures of respective brake cylinders thereof so as to restrain rotations of the respective wheels;
a brake operating member operable by an operator of the vehicle;
a master cylinder including a pressurizing piston that is linked to said brake operating member and a pressurizing chamber that is located on a front side of said pressurizing piston;
a booster chamber of a hydraulic pressure booster;
an electromagnetic linear valve provided on an output side of said booster chamber of said hydraulic pressure booster;
a linear valve controlling portion that is configured to control said electromagnetic linear valve;
a common passage to which at least one first brake cylinder, at least one second brake cylinder, said booster chamber of a hydraulic pressure booster, said pressurizing chamber of said master cylinder, and said power hydraulic pressure source are connected;
a separate valve disposed between a first passage portion and a second passage portion of said common passage, wherein said at least one first brake cylinder and said booster chamber of a hydraulic pressure booster are connected to said first passage portion while said at least one second brake cylinder, said pressurizing chamber of said master cylinder and said power hydraulic pressure source are connected to said second passage portion, said separate valve being switchable between open and closed states thereof by selectively turning ON and OFF a supply of electric current to a first solenoid;
a power-hydraulic pressure source cutoff valve disposed between said power hydraulic pressure source and said second passage portion of said common passage, and power-hydraulic-pressure-source cutoff valve being switchable between open and closed states thereof by selectively turning ON and OFF the supply of electric current to a second solenoid; and
wherein the vehicle includes a drive device having at least one electric motor,
wherein the wheels include at least one drive wheel that is connected to said at least one electric motor and at least one non-drive wheel,
wherein said plurality of hydraulic brakes includes (a) at least one disk brake provided for the at least one drive wheel and (b) at least one drum brake provided for the at least one non-drive wheel, said at least one first brake cylinder being a brake cylinder of each of said at least one disk brake, and said at least one second brake cylinder being a brake cylinder of each of said at least one drum brake,
a controller programmed to control the linear valve controlling portion, said electromagnetic linear valve, said separate valve, and said power-hydraulic pressure source cutoff valve, such that
said booster chamber of a hydraulic pressure booster is in communication with said at least one first brake cylinder that is said brake cylinder of each of said at least one disk brake via said electromagnetic linear valve, and is isolated from said at least one second brake cylinder that is said brake cylinder of each of said at least one drum brake via said separate valve, in a case when a regenerative cooperative control is executed, and
said pressurizing chamber of said master cylinder is in communication with said second brake cylinder and is isolated from said first brake cylinder, in the case when the regenerative cooperative control is executed, and
said linear valve controlling portion includes a controlling portion configured to control said hydraulic pressure of said first brake cylinder, by controlling at least said electromagnetic linear valve, in the case when the regenerative cooperative control is executed.

2. The hydraulic brake system according to claim 1, wherein said separate valve and said power-hydraulic pressure source cutoff valve are placed in the closed states, in the case when the regenerative cooperative control is executed.

3. The hydraulic brake system according to claim 2, comprising:
a master cutoff valve disposed between said pressurizing chamber of said master cylinder and said common passage; and
a hydraulic-pressure supply controller configured to control supply of the hydraulic pressure to said common passage from at least one of said power hydraulic pressure source, said pressurizing chamber of said master cylinder and said booster chamber of said hydraulic pressure booster, by controlling said power-hydraulic-pressure-source cutoff valve, said master cutoff valve, and said electromagnetic linear valve.

4. The hydraulic brake system according to claim 3, wherein said hydraulic-pressure supply controller includes a brake-assist-control-execution-time hydraulic-pressure supply controlling portion that is configured, in a case when a brake assist control is executed, to establish a state in which said first passage portion and said second passage portion of said common passage are in communication with each other while the hydraulic pressure is suppliable to said common passage from said power hydraulic pressure source without supply of the hydraulic pressure to said common passage from said booster chamber of a hydraulic pressure booster and said pressurizing chamber of said master cylinder.

5. The hydraulic brake system according to claim 1, wherein said hydraulic pressure booster includes a power piston that is linked to said brake operating member and said pressurizing piston, said hydraulic pressure booster being configured to cause a hydraulic pressure in a regulator chamber to be adjusted to a magnitude corresponding to the operating force applied to said brake operating member by operation of said brake operating member, and to supply the adjusted hydraulic pressure to said booster chamber that is located on a rear side of said power piston, so as to boost the operating force applied to said brake operating member and output the boosted operating force to said pressurizing piston.

6. The hydraulic brake system according to claim 1, wherein said linear valve controlling portion includes:
a required-deceleration-dependent target hydraulic pressure determining portion configured to determine the target hydraulic pressure whose magnitude provides a deceleration of the vehicle that is determined based on an operational state of said brake operating member, said linear valve controlling portion being configured to control said electromagnetic linear valve such that an output hydraulic pressure of said hydraulic pressure booster becomes close to the target hydraulic pressure determined by said required-deceleration-dependent target hydraulic pressure determining portion.

7. A hydraulic brake system comprising:
a plurality of hydraulic brakes provided for respective wheels of a vehicle, and configured to be activated by hydraulic pressures of respective brake cylinders thereof so as to restrain rotations of the respective wheels;
a brake operating member operable by an operator of the vehicle;
a master cylinder including a pressurizing piston that is linked to said brake operating member and a pressurizing chamber that is located on a front side of said pressurizing piston; and
a first hydraulic pressure generator including a first hydraulic pressure source and a first hydraulic pressure controlling portion that is configured to control an output hydraulic pressure of said first hydraulic pressure source to a target hydraulic pressure, wherein the wheels include at least one drive wheel and at least one non-drive wheel,
wherein said plurality of hydraulic brakes includes (a) at least one disk brake provided for the at least one drive wheel and (b) at least one drum brake provided for the at least one non-drive wheel,
wherein said first hydraulic pressure source is a booster chamber of a hydraulic pressure booster, and said first hydraulic pressure controlling portion is configured to control the hydraulic pressure of said booster chamber to the target hydraulic pressure,
wherein said first hydraulic pressure generator is in communication with a first brake cylinder that is said brake cylinder of each of said at least one disk brake, and is isolated from a second brake cylinder that is said brake cylinder of each of said at least one drum brake, in a case when a regenerative cooperative control is executed, wherein said pressurizing chamber of said master cylinder is in communication with said second brake cylinder and is isolated from said first brake cylinder, in the case when the regenerative cooperative control is executed, said hydraulic brake system comprising:

a common passage to which said at least one first brake cylinder, said at least one second brake cylinder, said first hydraulic pressure generator, and said pressurizing chamber of said master cylinder are connected;

a separate valve disposed between a first passage portion and a second passage portion of said common passage, wherein said at least one first brake cylinder and said first hydraulic pressure generator are connected to said first passage portion while said at least one second brake cylinder and said pressurizing chamber of said master cylinder are connected to said second passage portion;

a power hydraulic pressure source which is connected to said second passage portion of said common passage and which serves as a third hydraulic pressure source configured to generate a hydraulic pressure by supply of electric power thereto;

a power-hydraulic-pressure-source cutoff valve disposed between said power hydraulic pressure source and said second passage portion of said common passage;

a first-hydraulic-pressure-generator cutoff valve disposed between said first hydraulic pressure generator and said common passage;

a master cutoff valve disposed between said pressurizing chamber of said master cylinder and said common passage; and a hydraulic-pressure supply controller configured to control supply of the hydraulic pressure to said common passage from at least one of said power hydraulic pressure source, said pressurizing chamber of said master cylinder, and said first hydraulic pressure generator, by controlling said power-hydraulic-pressure-source cutoff valve, said master cutoff valve, and said first-hydraulic-pressure-generator cutoff valve, wherein said hydraulic-pressure supply controller includes an antilock-control-execution-time hydraulic-pressure supply controlling portion that is configured, in a case when an antilock control is executed, to establish a state in which said first passage portion and said second passage portion of said common passage are isolated from each other while the hydraulic pressure is suppliable to said common passage from said first hydraulic pressure generator and said power hydraulic pressure source without supply of the hydraulic pressure to said common passage from said pressurizing chamber of said master cylinder.

8. The hydraulic brake system according to claim 1, wherein said linear valve controlling portion includes:

a regenerative-cooperative-control-execution-time target hydraulic pressure determining portion that is configured to determine the target hydraulic pressure such that an actual total braking force becomes close to a required total braking force that is determined based on an operational state of said brake operating member, the actual total braking force including at least one of a regenerative braking force applied to said at least one drive wheel, a hydraulic braking force applied, by the hydraulic pressure of said first brake cylinder, to said at least one drive wheel and a hydraulic braking force applied, by the hydraulic pressure of said second brake cylinder, to said at least one non-drive wheel, said linear valve controlling portion being configured to control said electromagnetic linear valve such that an output hydraulic pressure of said hydraulic pressure booster becomes close to the target hydraulic pressure determined by said regenerative-cooperative-control-execution-time target hydraulic pressure determining portion.

9. A process of controlling a hydraulic pressure of at least one first brake cylinder in a case when a regenerative cooperative control is executed in a hydraulic brake system, wherein the at least one first brake cylinder is at least one brake cylinder of at least one disk brake that is provided for at least one drive wheel of a vehicle, wherein the hydraulic brake system includes:

at least one second brake cylinder of at least one drum brake that is provided for at least one non-drive wheel of the vehicle;

a brake operating member operable by an operator of the vehicle;

a master cylinder including a pressurizing piston that is linked to the brake operating member and a pressurizing chamber that is located on a front side of the pressurizing piston;

a power hydraulic pressure source;

an electromagnetic linear valve provided on an output side of the power hydraulic pressure source;

a common passage to which the at least one first brake cylinder, the at least one second brake cylinder, the power hydraulic pressure source and the pressurizing chamber of the master cylinder are connected; and a separate valve disposed between a first passage portion and a second passage portion of the common passage, wherein the at least one first brake cylinder and the power hydraulic pressure source are connected to the first passage portion while the at least one second brake cylinder and the pressurizing chamber of the master cylinder are connected to the second passage portion; and a controller programmed to control said electromagnetic linear valve and said separate valve, said process comprising:

a target hydraulic-pressure determining step of determining a target value of the hydraulic pressure of the first brake cylinder, such that an actual total braking force becomes close to a required total braking force that is determined based on an operational state of the brake operating member, the actual total braking force including at least one of (i) a regenerative braking force applied to the at least one drive wheel, (ii) a hydraulic braking force applied, by the hydraulic pressure of the first brake cylinder, to the at least one drive wheel and (iii) a hydraulic braking force applied, by the hydraulic pressure of the second brake cylinder, to the at least one non-drive wheel; and a controlling step of controlling the electromagnetic linear valve via said controller, such that an output hydraulic pressure of the power hydraulic pressure source becomes close to the target value of the hydraulic pressure that is determined at said target hydraulic-pressure determining step, with the power hydraulic pressure source being in communication with the first brake cylinder via the electromagnetic linear valve and being isolated from the second brake cylinder, and with the pressurizing chamber of the master cylinder being in communication with the second brake cylinder and being isolated from the first brake cylinder.

10. The process according to claim 9,
wherein said controlling step includes a separate-valve closing step of closing the separate valve, so as to bring the power hydraulic pressure source into communication with the first brake cylinder via the electromagnetic linear valve and separate the power hydraulic pressure source from the second brake cylinder, and so as to bring the pressurizing chamber of the master cylinder into communication with the second brake cylinder and separate the pressurizing chamber of the master cylinder from the first brake cylinder.

11. A process of controlling a hydraulic pressure of at least one first brake cylinder in a case when a regenerative cooperative control is executed in a hydraulic brake system,
wherein the at least one first brake cylinder is at least one brake cylinder of at least one disk brake that is provided for at least one drive wheel of a vehicle,
wherein the hydraulic brake system includes:
at least one second brake cylinder of at least one drum brake that is provided for at least one non-drive wheel of the vehicle, so as to restrain rotation of the non-drive wheel;
a brake operating member operable by an operator of the vehicle;
a master cylinder including a pressurizing piston that is linked to the brake operating member and a pressurizing chamber that is located on a front side of the pressurizing piston;
a booster chamber of a hydraulic pressure booster;
an electromagnetic linear valve provided on an output side of the booster chamber of the hydraulic pressure booster; and
a controller programmed to control said electromagnetic linear valve, said process comprising:
a target hydraulic-pressure determining step of determining a target value of the hydraulic pressure of the first brake cylinder, such that an actual total braking force becomes close to a required total braking force that is determined based on an operational state of the brake operating member, the actual total braking force including at least one of (i) a regenerative braking force applied to the at least one drive wheel, (ii) a hydraulic braking force applied, by the hydraulic pressure of the first brake cylinder, to the at least one drive wheel and (iii) a hydraulic braking force applied, by the hydraulic pressure of the second brake cylinder, to the at least one non-drive wheel; and
a controlling step of controlling the electromagnetic linear valve, such that an output hydraulic pressure of the booster chamber becomes close to the target value of the hydraulic pressure that is determined at said target hydraulic pressure determining step, with the booster chamber being in communication with the first brake cylinder and being isolated from the second brake cylinder, and with the pressurizing chamber of the master cylinder being in communication with the second brake cylinder and being isolated from the first brake cylinder.

\* \* \* \* \*